(12) United States Patent
Georgiou et al.

(10) Patent No.: US 11,243,399 B2
(45) Date of Patent: Feb. 8, 2022

(54) HEAD MOUNTED DISPLAY DEVICE WITH DOUBLE FACETED OPTICS

(71) Applicant: Microsoft Technology Licensing, LLC, Redmond, WA (US)

(72) Inventors: Andreas Georgiou, Cambridge (GB); Alfonsus D. Lunardhi, San Ramon, CA (US); Joel Steven Kollin, Seattle, WA (US); Bernard C. Kress, Seattle, WA (US); Ishan Chatterjee, Seattle, WA (US); Mario Possiwan, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/779,220

(22) Filed: Jan. 31, 2020

(65) Prior Publication Data

US 2021/0239979 A1 Aug. 5, 2021

(51) Int. Cl.
*G02B 27/01* (2006.01)
*G02B 27/00* (2006.01)
*G02B 27/30* (2006.01)

(52) U.S. Cl.
CPC ..... *G02B 27/0172* (2013.01); *G02B 27/0093* (2013.01); *G02B 27/30* (2013.01); *G02B 2027/0178* (2013.01)

(58) Field of Classification Search
CPC ............ G02B 27/0172; G02B 27/0093; G02B 27/30; G02B 2027/0178
See application file for complete search history.

(56) References Cited

U.S. PATENT DOCUMENTS

| 10,386,645 | B2 | 8/2019 | Abou Shousha |
| 2005/0007673 | A1 | 1/2005 | Chaoulov et al. |
| 2015/0085259 | A1 | 3/2015 | Schreiber et al. |
| 2016/0097930 | A1* | 4/2016 | Robbins ............ G02B 27/0172 345/8 |
| 2016/0320620 | A1 | 11/2016 | Maimone |
| 2017/0038590 | A1 | 2/2017 | Jepsen |
| 2017/0109562 | A1 | 4/2017 | Shroff et al. |
| 2017/0139213 | A1 | 5/2017 | Schmidtlin |
| 2017/0177075 | A1 | 6/2017 | Zhang |
| 2017/0227777 | A1 | 8/2017 | Carollo |

(Continued)

FOREIGN PATENT DOCUMENTS

| ER | 0598608 A1 | 5/1994 |
| KR | 20190020826 A | 3/2019 |
| WO | 201721703 A1 | 12/2017 |

OTHER PUBLICATIONS

"International Search Report and Written Opinion Issued in PCT Application No. PCT/US20/064743", dated Apr. 7, 2021, 17 Pages.

(Continued)

*Primary Examiner* — Kenneth B Lee, Jr.
(74) *Attorney, Agent, or Firm* — Rainier Patents, P.S.

(57) ABSTRACT

This document relates to head mounted display devices. In one example the head mounted display device includes a light engine including an array of individually controllable pixels that can be energized to emit light. The example also includes an optical assembly physically aligned with the light engine and including a set of focusing elements facing toward the light engine and a different set of focusing elements facing away from the light engine.

20 Claims, 27 Drawing Sheets

(56) References Cited

U.S. PATENT DOCUMENTS

| | | |
|---|---|---|
| 2017/0255012 A1 | 9/2017 | Tam |
| 2017/0255020 A1 | 9/2017 | Tam et al. |
| 2017/0293146 A1 | 10/2017 | Nicholls et al. |
| 2018/0067317 A1* | 3/2018 | Barton ............... G02B 27/0176 |
| 2019/0094545 A1 | 3/2019 | Lo et al. |
| 2019/0250406 A1* | 8/2019 | Nakamura ............... G03H 1/04 |

OTHER PUBLICATIONS

"Non Final Office Action Issued in U.S. Appl. No. 17/103,693", dated Jun. 8, 2021, 8 Pages.

"International Search Report and Written Opinion Issued in PCT Application No. PCT/US2021/014028", dated Apr. 26, 2021, 17 Pages.

\* cited by examiner

HEAD MOUNTED DISPLAY DEVICE WITH DOUBLE FACETED OPTICS

BACKGROUND

Head mounted display devices can enable users to experience immersive virtual reality scenarios. Such technology may be incorporated into a device in the form of eyeglasses, goggles, a helmet, a visor, or some other type of head-mounted display (HMD) device or eyewear. In order for the HMD device to be comfortable for any length of time, the head mounted display should be positioned relatively closely to the user's face (e.g. eyes) and should be relatively light weight.

Existing configurations tend to employ an image generator that generates an image and an optical assembly positioned between the image generator and the user's eyes. The optical assembly is intended to deliver the image for receipt by the user's eyes. Stated another way, the optical assembly is intended to create an image with a specified field of view (FoV), resolution, and/or eye box. Existing optical assemblies tend to use a single conventional refractive optical element, such as a single lens to form the eye box and this results in a heavy and large lens. A high percentage of the weight tends to come from the heavy lens. In such existing arrangements, the single lens is used to both focus and collimate (i.e. make parallel) the rays leaving the display. Such configurations can be both physically bulky and heavy and inefficient in that much of the generated light never reaches the eye box.

The present concepts can solve these and other issues by employing multiple optical elements that work cooperatively in tandem to deliver specified optical functionality, while being lighter, less bulky, and/or affordable to manufacture, among other advantages.

BRIEF DESCRIPTION OF THE DRAWINGS

The Detailed Description is described with reference to the accompanying figures. In the figures, the left-most digit(s) of a reference number identifies the figure in which the reference number first appears. The use of similar reference numbers in different instances in the description and the figures may indicate similar or identical items.

DETAILED DESCRIPTION

Overview

Head-mounted display (HMD) devices can present virtual content to a user. The content or imagery is typically reproduced over an image area called an "eye box" that can correspond to various positions and angular directions associated with the user's eye. However, for traditional HMD devices, reproduction of an image having a wide field of view (FOV) can be difficult, as existing techniques for displaying a high FOV image typically attempt to optimize the image over the entire eye box in order to account for a user's eye movement in any direction, along with variances in eye shape and size. This full eye box image optimization subsequently results in an overly heavy and expensive HMD device in order to perform such optimization, as complex, expensive, and bulky optical components can be used in order to perform such optimization. Alternative traditional designs employ a single optical element, such as a single lens. While simplifying the design and cost, a single lens results in inefficiencies because much of the light never reaches the eye box and/or is not properly collimated to provide a clear image for the user. As such, there remain difficulties in generating a consistently high-quality image in a light-weight and cost-effective HMD device.

The described concepts can address these issues by employing two optical sub-assemblies that function in tandem. The first optical sub-assembly can provide a majority of the focusing functionality. The second optical assembly can include multiple planarly arranged lenses (e.g., micro lenses) that receive the focused light and provide a majority of the collimating functionality. This combination can provide a large field of view and a large eye box that is conveniently positioned for the user and provide high resolution images. Further, subsets of the micro lenses can be operated cooperatively to provide a quality user image experience while conserving resources.

Figure 1A:
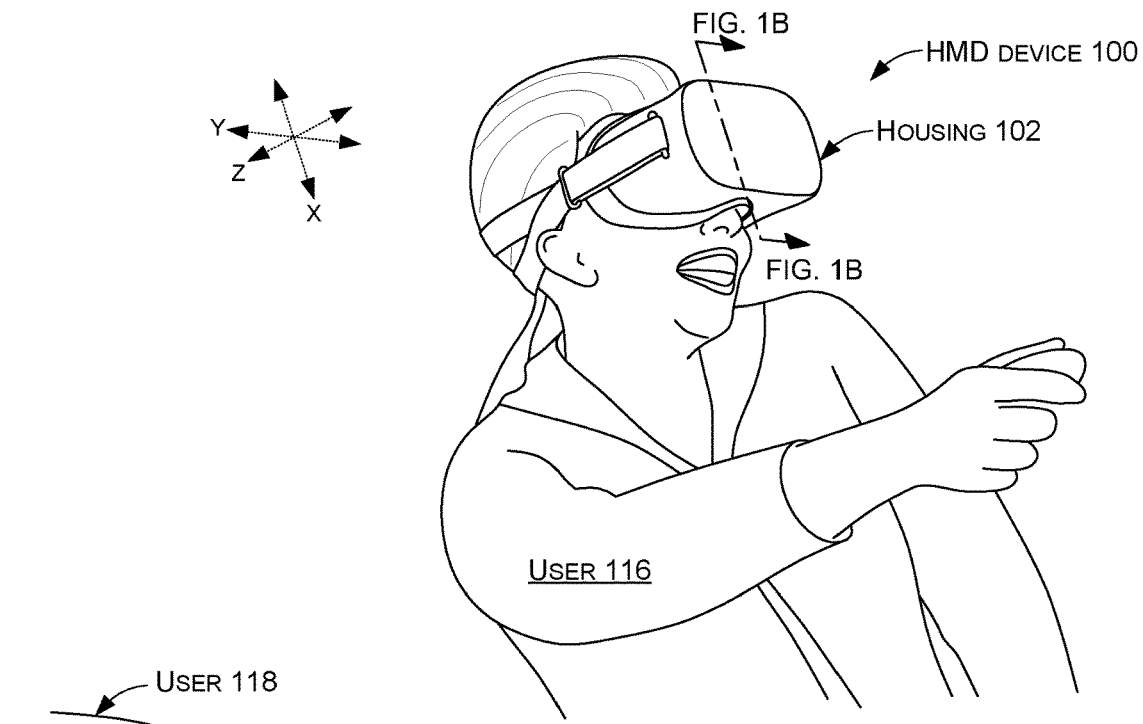
FIG. 1A illustrates a perspective view of an example HMD device that is consistent with some implementations of the present concepts.
Figure 1B:
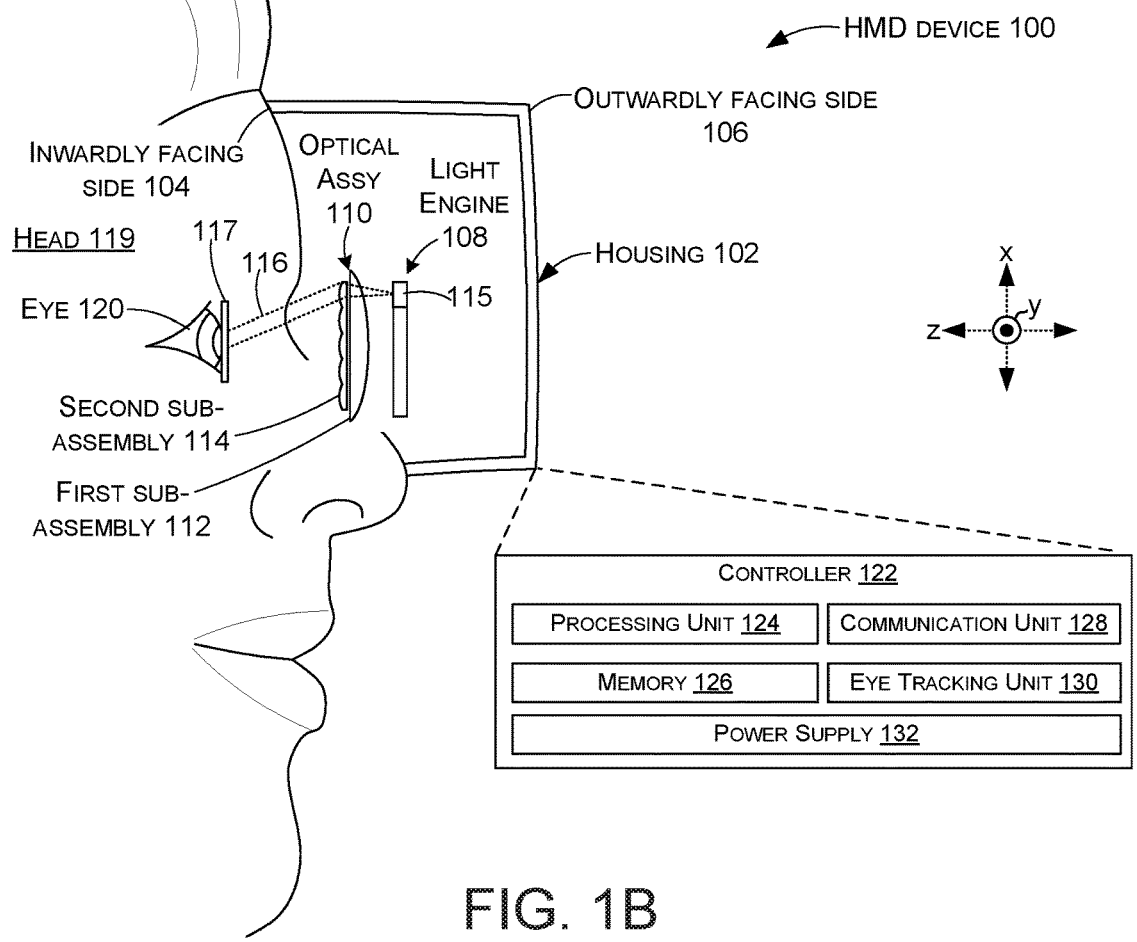
FIGS. 1B, 2A, 2B, 3-14B, 16, 19, 20A-20D, and 21 illustrate elevational views of example HMD devices that are consistent with some implementations of the present concepts.

FIGS. 1A and 1B collectively depict an example HMD device 100 which can implement the present concepts. HMD device 100 can include a housing 102. The housing can define an inwardly facing side 104 and an outwardly facing side 106. The housing 102 can also orient a light engine 108 and an optical assembly 110. The optical assembly can include a first sub-assembly 112 and a second sub-assembly 114.

Light engine 108 can generate light rays representing the image. Light engine 108 may be any sort of device capable of emitting light, such as from one or more independently-controllable elements 115, such as light emitting diodes, laser diodes, and/or organic light emitting diodes (OLEDS), among others. The individual independently-controllable elements 115 can be driven according to one or more parameter values, such as power level, to produce a light 116 of a corresponding light intensity, color, etc.

Briefly, the first sub-assembly 112 can be positioned proximate to the light engine 108 and configured primarily to focus light 116 from the light engine. The second sub-assembly 114 can be positioned distal to the light engine (e.g., on an opposite side of the first sub-assembly). The second sub-assembly 114 can be configured to receive light from the first sub-assembly 112 and to collimate at least some of the light toward an eye box 117 to form an image in the eye box for a user 118. These aspects are described below in more detail relative to FIGS. 2A and 2B.

The user 118 can wear the HMD device 100. For instance, the inwardly facing side 104 of the housing 102 can be configured to be positioned toward and/or against a head 119 of the user (e.g., engaged by the user's head) so that the light engine 108 and the optical assembly 110 are physically aligned with an eye 120 of the user. Note that while the sectional view of FIG. 1B shows one eye, another light engine 108 and another optical assembly 110 can be positioned relative to the other eye to create stereoscopic effects.

From another perspective the light engine 108 can generate light rays corresponding to image data. The light rays are then focused and collimated by the optical assembly 110 to "paint" the image over the eye box 117 corresponding to a user's eye. The eye box can be defined as a range of possible pupil positions (e.g., locations) and gaze directions of a user's eye. Due to the variability of head sizes and the variability of interpupillary distances of users of the HMD device, and because it is difficult to know exactly where a user's gaze may be directed, the HMD device typically optimizes the generated image for a substantial range of image angles and pupil positions in order to account for all possible positions of a user's eye. However, some of the present implementations can utilize information about the eye location, gaze direction, and/or pupil size to customize eye box formation. This aspect will be explained in more detail below.

The head mounted display device 100 can also include a controller 122, a processing unit 124, storage and/or memory 126, a communication unit 128, an eye tracking unit 130, and/or a power supply 132. In some implementations controller 122 may include the processing unit 124 and the memory 126. The controller can utilize the memory for storing processor readable instructions and/or data, such as user data, image data, etc. The communication unit 128 can be communicatively coupled to the processing unit 124 and can act as a network interface for connecting the HMD device to another computer system. The eye-tracking unit 130 may be configured to track a current pupil position/location, gaze direction, movement, etc. of the user's eyes.

Controller 122 may provide commands and instructions, such as driving power to the individually controllable elements 115 of the light engine 108 to generate images for a virtual visualization. In some implementations, the controller 122 can also receive eye-tracking information that can be used by processing unit 124 to control light engine 108 to generate light that can customize image generation based upon the user (e.g., eye position and/or gaze direction). Such eye-tracking information can be obtained from eye-tracking unit 130. For example, eye-tracking unit 130 may also include a detecting feature that can capture light reflected from a cornea of the user's eye, such as by detecting glints of light and/or other detectable features associated with the user's eye, to determine the pupil position and gaze direction of the eye. Eye tracking unit 130 can further be configured to detect dilation amounts associated with the user's pupil, which can be considered by the controller to determine the size of the eye box associated with the dilated eye.

Processing unit 124 may include one or more processors including a central processing unit (CPU) and/or a graphics processing unit (GPU). Memory 126 can be a computer-readable storage media that may store instructions for execution by processing unit 124, to provide various functionality to HMD device 100. Finally, power supply 132 can provide power for the components of controller 122 and the other components of HMD device 100, such as light engine 108 and additional components that may be included in HMD device 100, such as image capture devices (e.g. cameras), audio devices (e.g. microphones and speakers), and/or location/motion capture devices (e.g. accelerometers).

FIGS. 2A-13 collectively introduce structural details of several example HMD devices. These FIGS. illustrate views taken along the xz reference plane (e.g., vertically). The description can also apply along the yz reference plane (e.g., horizontally).

Figure 2A:
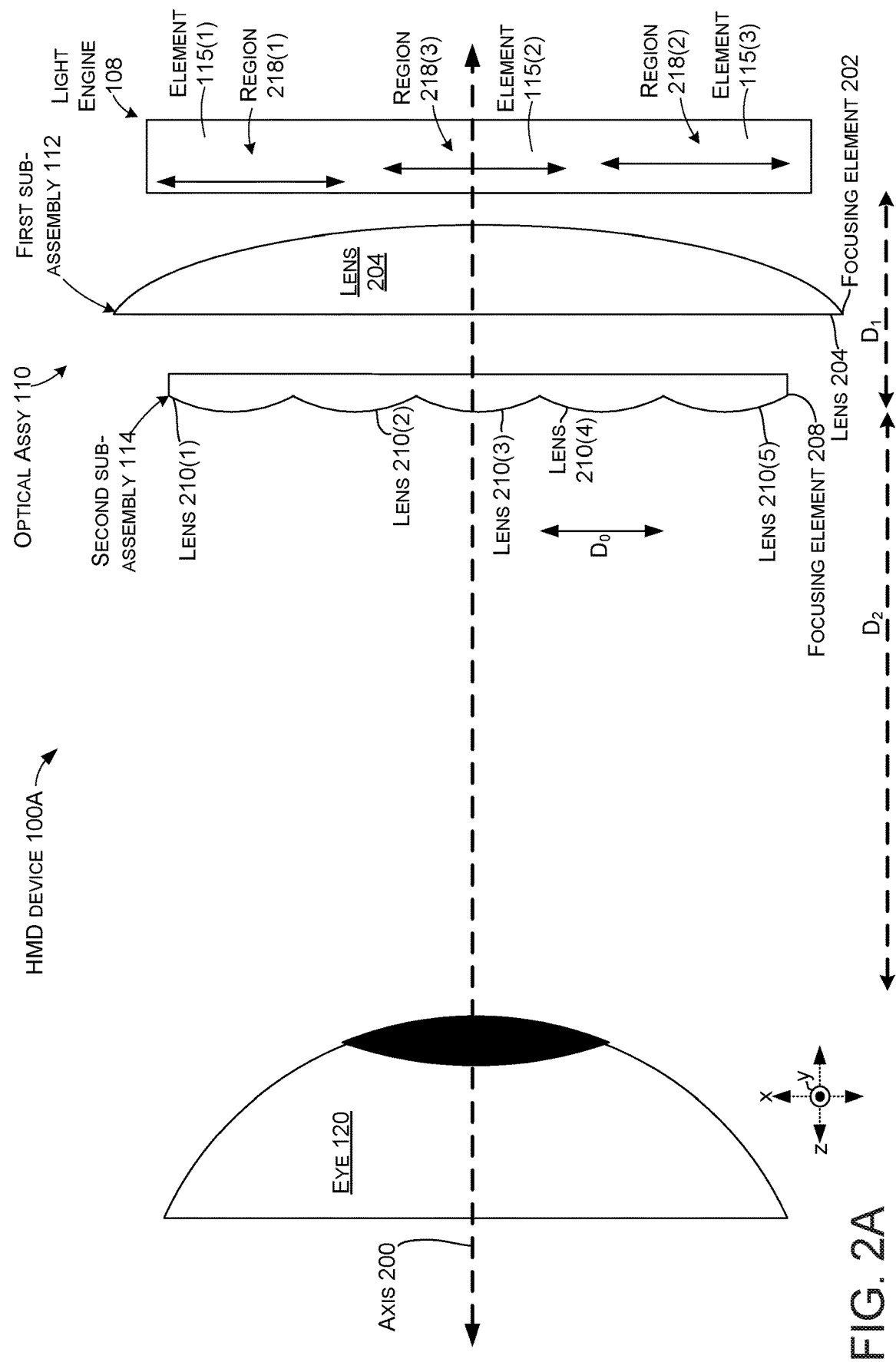
Figure 2B:
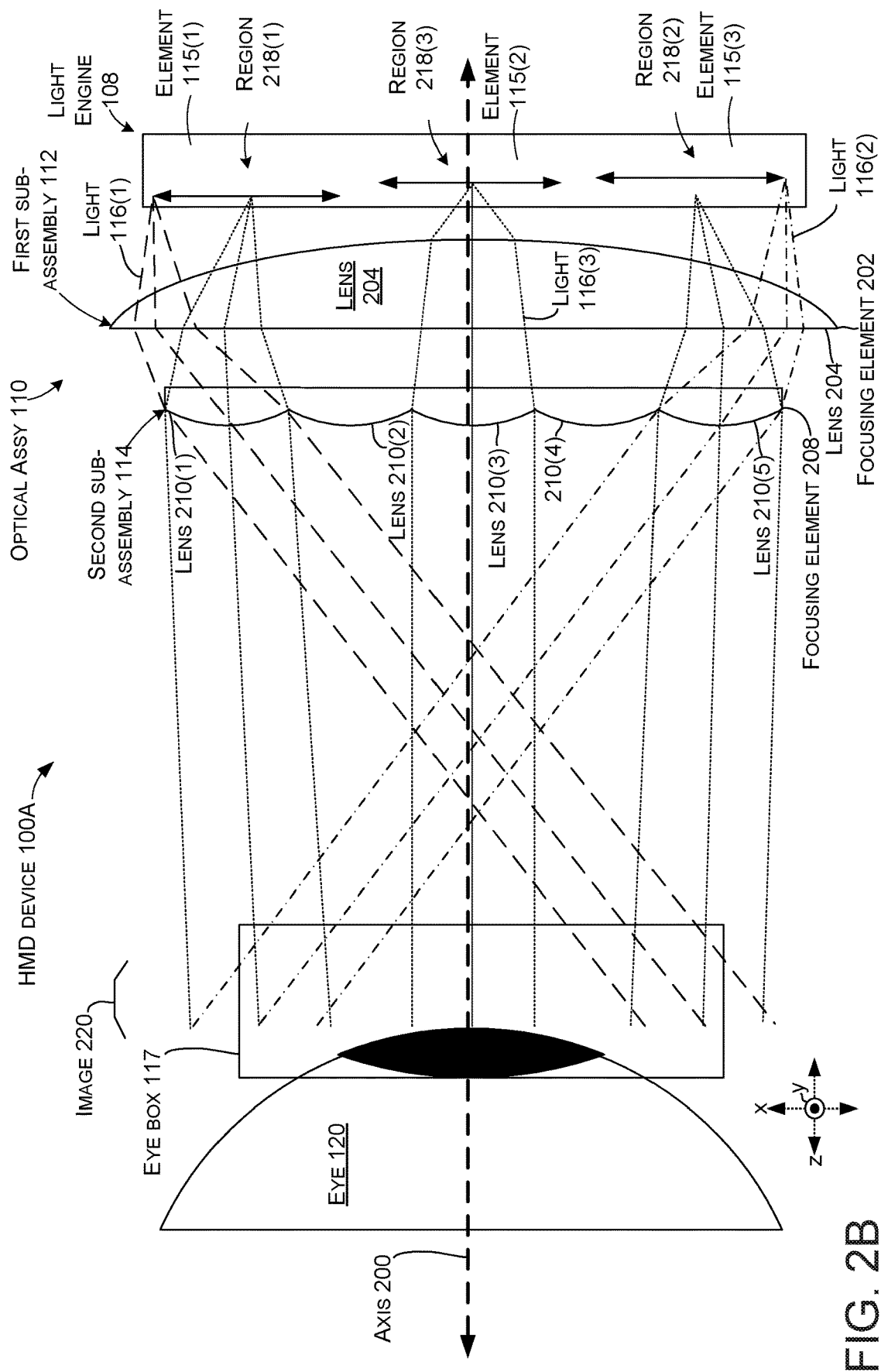

FIG. 2A shows details of example HMD device 100A.
FIG. 2B shows HMD device 100A with illustrative light 116 added for purposes of explanation. In this example, the optical assembly 110 and the light engine 108 are oriented transverse an optical axis 200 extending outwardly from the user's eye 120 through the center of the lens. In this case, the first sub-assembly 112 includes a focusing element 202, which is manifest as a single lens 204. Alternative configurations are described below relative to FIGS. 5 and 11. In this case the lens 204 has a curved surface 206 facing the light engine 108 and a flat surface 207 facing away from the light engine. In this example, the curved surface 206 has a surface profile that has a low rate of curvature proximate to the optical axis 200 at a center of the lens 204 and an increasing rate of curvature toward a periphery of the lens 204.

In this implementation, the second sub-assembly 114 includes a focusing element 208, which is manifest as multiple lenses 210. In this case, the multiple lenses 210 are convex lenses that are coplanar to one another. Particularly, in this case the multiple lenses 210 are planoconvex lenses. Stated another way, the lenses 210 have a curved surface 212 and an opposing flat surface 214 (specifically designated relative to lens 210(5)). The flat surfaces 214 lie in a plane that is parallel to the xy reference plane (e.g., transverse to the optical axis 200). An alternative configuration is described below relative to FIG. 12. Further, in this implementation the lenses 210 have the same overall dimension $D_0$. Also, the curved surfaces 212 have the same profile as one another. Alternative configurations are described below relative to FIGS. 5 and 11. Further, the lenses 210 are shown in an array along the x reference axis (e.g., one dimensional array). The lenses 210 can alternatively or additionally be arranged in an array along the y reference axis (e.g., two-dimensional array). However, in other implementations, the lenses 210 may not be arranged in arrays, but in some other manner, such as a random pattern or a pattern with an intentional degree of variation.

In the illustrated configuration of HMD device 100A, the focusing elements 202 and 208 are shown as distinct structures that are spaced apart from one another along the optical axis (e.g., parallel to the z reference direction). An alternative configuration is described below relative to FIG. 3.

As shown in FIG. 2B, focusing elements 202 and 208 work cooperatively to direct light 116 from light engine 108 to the user's eye 120. Specifically, light 116 can be generated by regions 218 of the light engine 108 and received by the focusing element 202 (e.g., back lens from the user's point of view). For purposes of explanation, the regions 218 can be associated with individual elements 115 introduced above relative to FIG. 1B. The focusing element 202 can refract the light 116 into focusing element 208 (e.g., front lens from the user's point of view), which collimates the light directed to the user.

In this example for purposes of explanation, light 116 is shown emitted from three regions 218 of the light engine 108. In some cases, the regions 218 can be analogized to emanating from individual selectively controllable elements 115 (e.g., pixels). In regards to light 116 on the drawing page, different line patterns can represent different portions of an intended or overall image 220 that is formed in an eye box 117. Thus, light 116(1) can represent a portion of the intended image 220, while light 116(2) can represent another portion of the intended image 220. These portions can collectively form the intended image 220 in the eye box 117. The eye box can be a volume, such as a frustum, where the user can perceive the entire image and experiences full field of view. For purposes of explanation, light 116(3) for the entire image is illustrated as dotted lines.

In this example, first sub-assembly 112 can, at least in part, focus the light 116 toward optical axis 200 to define eye box 117. The eye box 117 can be spaced sufficiently along the optical axis from the optical assembly 110 so that the user's eye can be comfortably positioned within the eye box 117. From one perspective, the first sub-assembly 112 can function to reduce the amount of light 116 that is lost (e.g., never reaches the eye box to be viewable by the user). In this example, the first sub-assembly 112 refracts light 116 received toward the periphery of the first sub-assembly to a greater extent than light received toward the center of the first sub-assembly. This configuration can ensure that most or all light received from the light engine 108 is directed to the eye box 117.

The second sub-assembly 114 can receive the refracted light 116 from the first sub-assembly 112. The second sub-assembly can, at least in part, form the image 220 in the eye box 117 by collimating the light received from the first sub-assembly. Note however that in this implementation the collimating is not performed uniformly by the second sub-assembly, but is instead performed locally by individual lenses 210 or groups of lenses. Thus, from one perspective, each lens 210 or group of lenses, can create an eye box and a FoV that matches that of the designed (e.g., defined) specifications (e.g., size, distance from optical assembly, etc.). This aspect will be described in more detail below relative to FIGS. 16-20D.

In this implementation, the multiple lenses 210 of the second sub-assembly 114 can be used in conjunction with large positive lens 204 of the first sub-assembly 112. Functionally, the lens 204 can act like a prism with a variable angle to bend the light 116 by a different angle depending on the distance from the optical axis 200. The multiple lenses 210 that are further away from the optical axis, such as lenses 210(1) and 210(5) will have their light 116 bent by a larger amount by focusing element 202 (e.g., lens 204). This configuration can produce an arrangement where each lens 210 creates only the necessary or viewable FoV, and thus few or no rays arrive outside the desired eye box 117. Thus, from one perspective, the present implementations can include an optical assembly 110 that includes a focusing element 202 that can be relatively flat (few mm's in thickness) and work in combination with the focusing element 208 to create an image with a large FoV, high resolution, and a large and conveniently positioned eye box 117. Further, some implementations can achieve the large FoV, high resolution, and large and conveniently positioned eye box in a dimensionally constrained HMD device. For instance, the light engine 108 and the optical assembly 110 can occupy a space (Distance $D_1$) that is less than a distance $D_2$ between the optical assembly 110 and the eye box 117. This can reduce the dimensions of the HMD device extending outwardly from the user's face. HMD devices are subject to greater dimensional constraints in the z reference direction than other optical devices.

Figure 3:
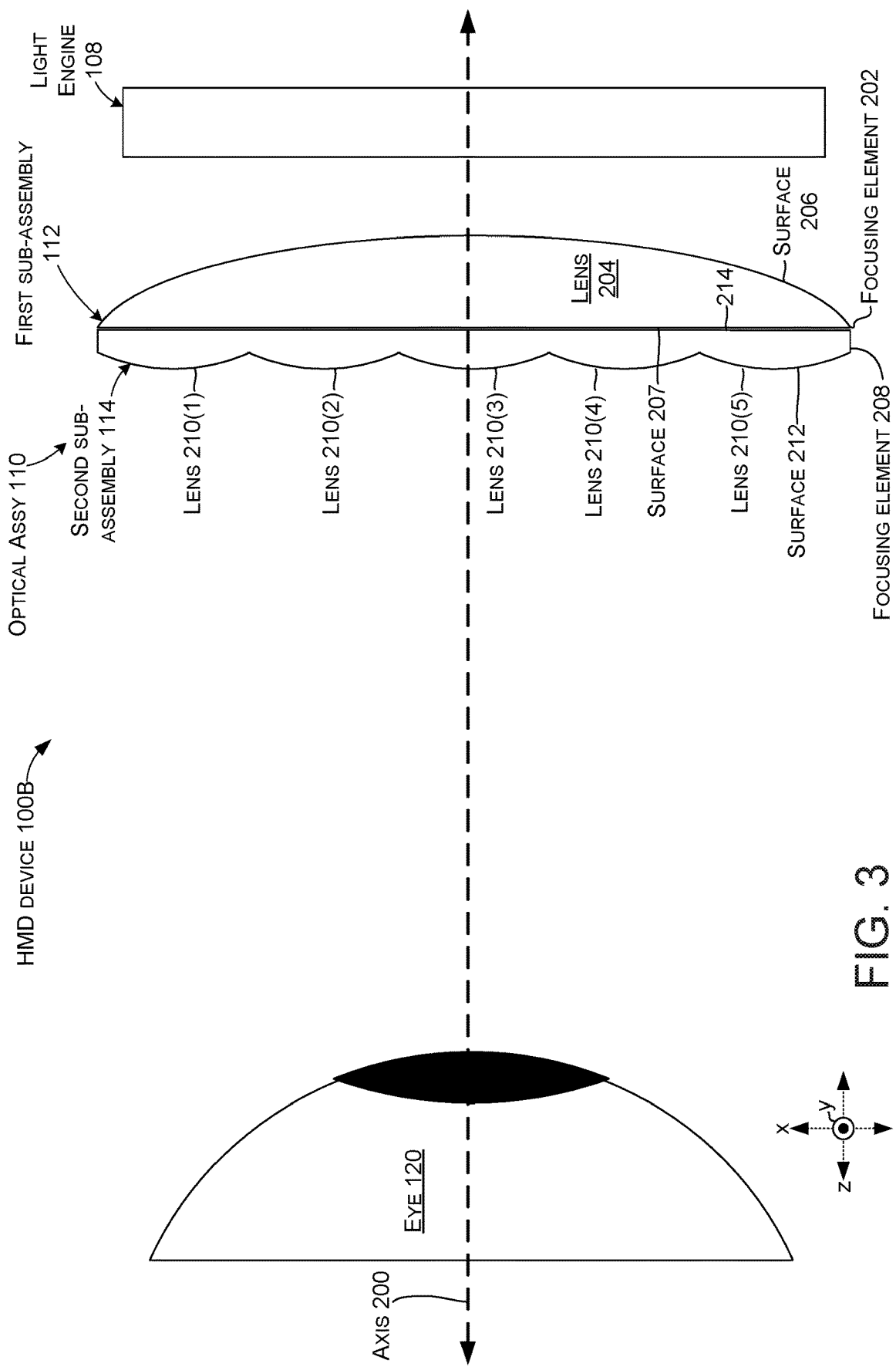

FIG. 3 shows an HMD device 100B that is similar to the HMD device 100A of FIGS. 2A and 2B. In HMD device 100B, focusing elements 202 and 208 are positioned against one another and can be manifest as a single structure, such as a molded or machined structure lacking distinct internal surfaces 207 and 214. Alternatively, focusing elements 202 and 208 can be formed as separate structures which are then secured against one another. In still other implementations, such as the illustrated implementation of FIGS. 2A and 2B, the focusing elements 202 and 208 are spaced apart from one another by the housing 102.

Figure 4:
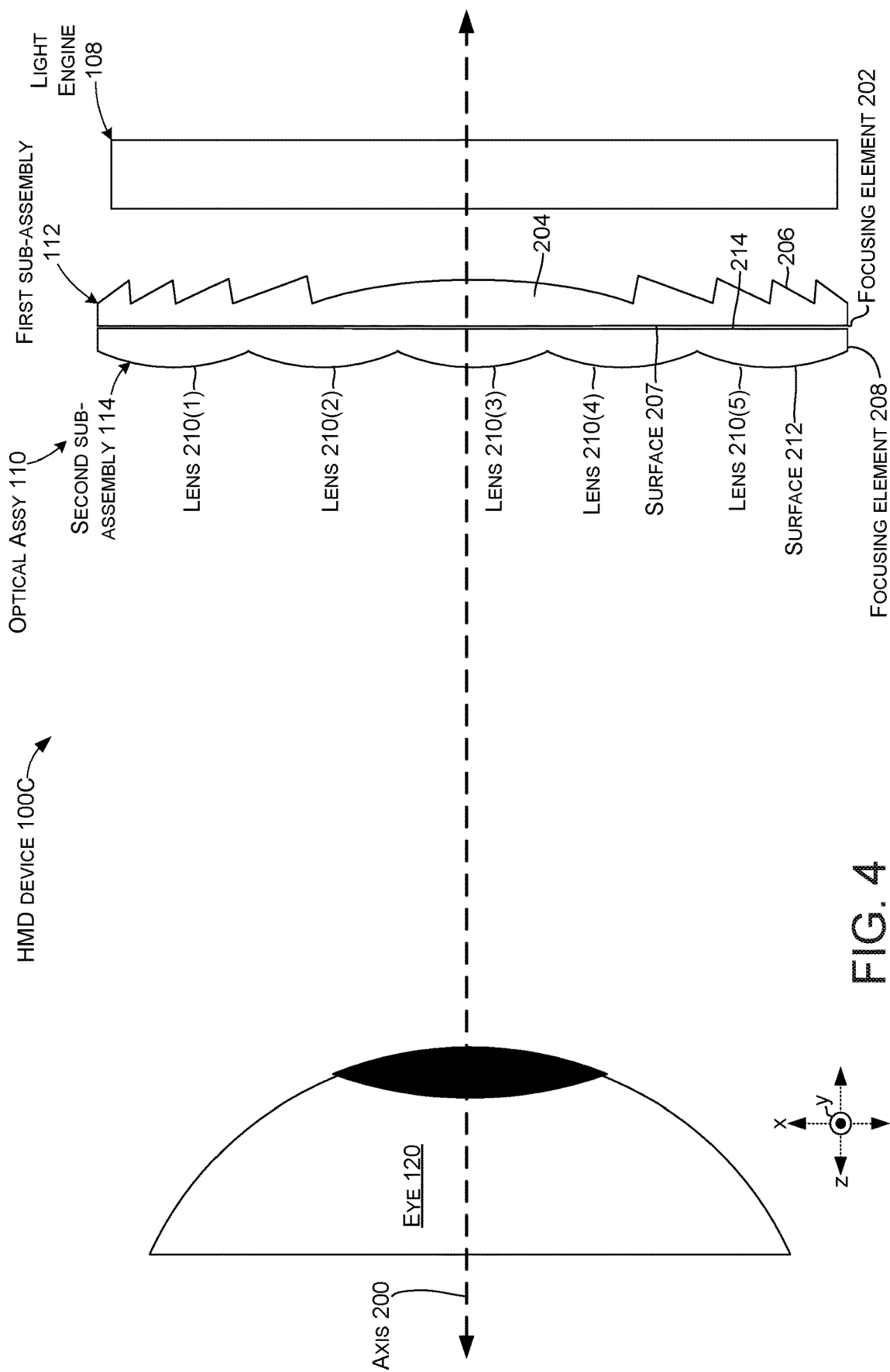

FIG. 4 shows HMD device 100C, which is similar to HMD device 100B of FIG. 3, except that lens 204 is manifest as a Fresnel lens. From one perspective, the Fresnel lens can include multiple smaller segments that perform the same operation on light as a large single lens as illustrated in FIG. 3. Note that the "bending power" of a lens depends primarily on its local curvature and not its thickness. The Fresnel lens can offer weight and/or thickness advantages compared to a standard lens configuration while offering similar refractive properties. Note that while a Fresnel lens is illustrated, other structures can be employed. For instance, an axicon could be substituted for the Fresnel lens.

In addition, while refractive lenses are shown here for simplicity, it is also possible to use reflective lenses, diffractive lenses, and/or any combinations thereof. Refractive lenses can also be fabricated by modulating the refractive index of the lens material, such as in a gradient index lens. Diffractive lens structures can be made by holographic, lithographic, or other means. Also, Geometric Phase Lenses can also be fabricated by (for example) carefully engineered cholesteric liquid crystals or metamaterial structures.

Figure 5:
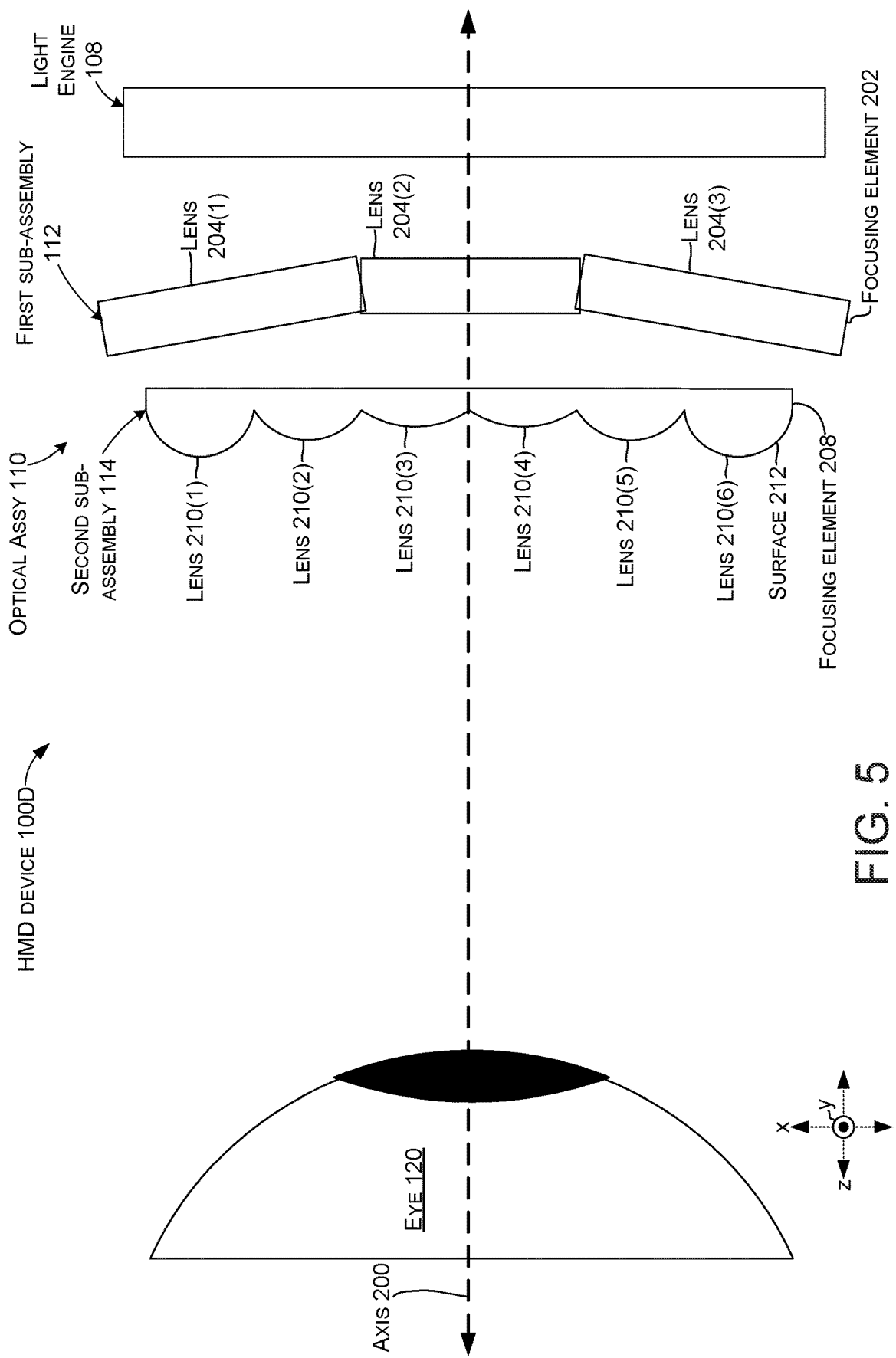
Figure 6:
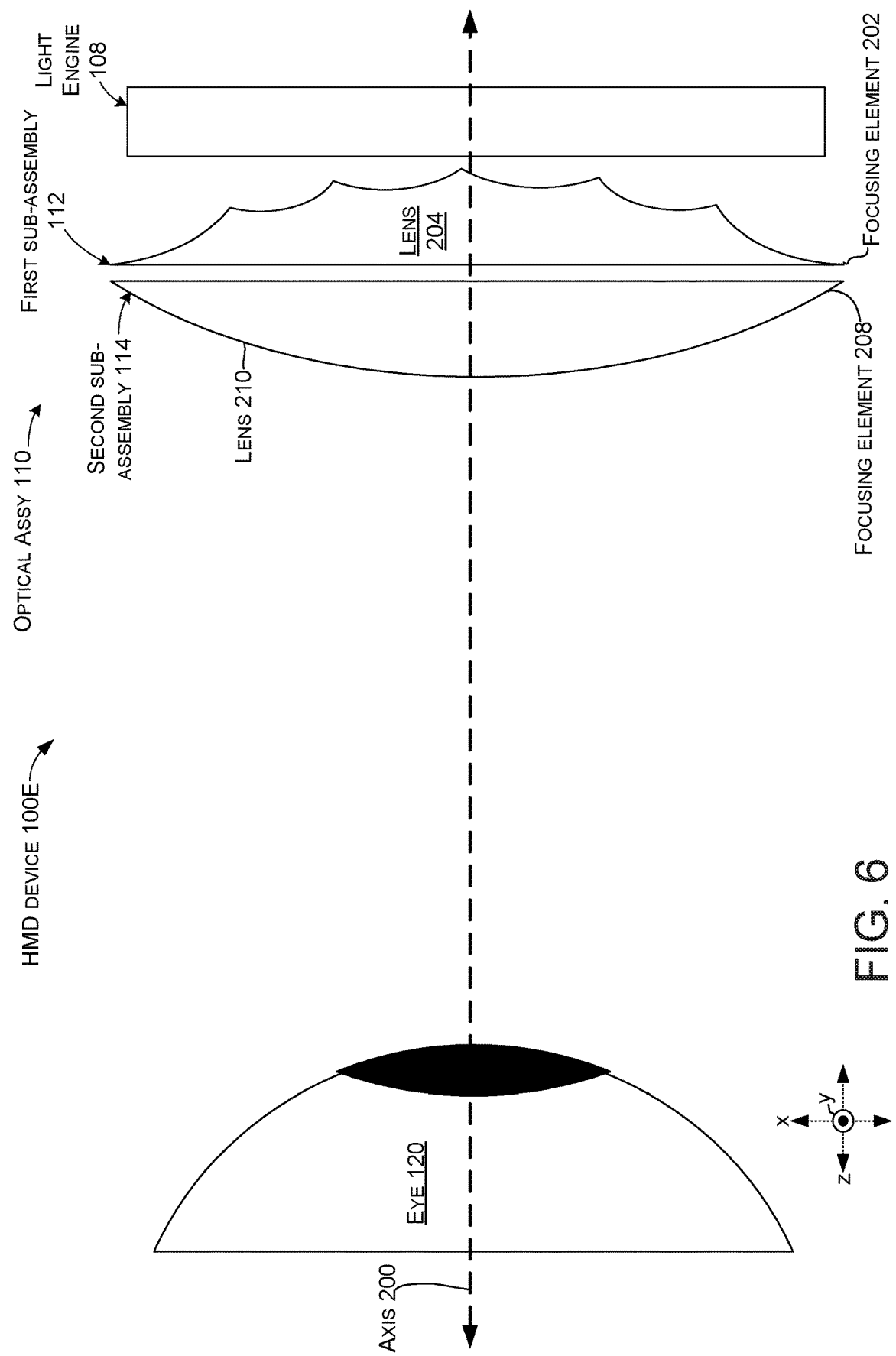
Figure 7:
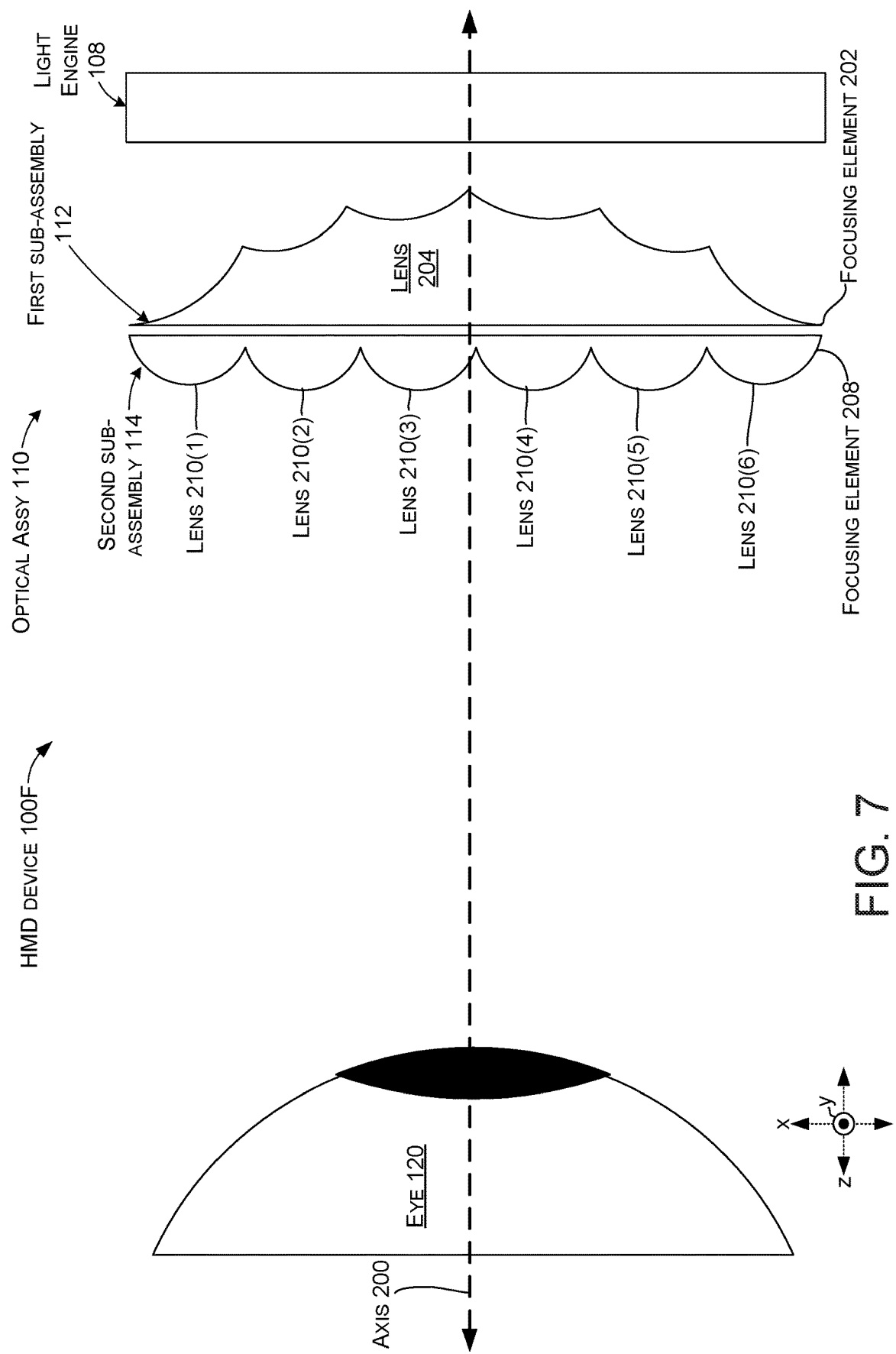
Figure 8:
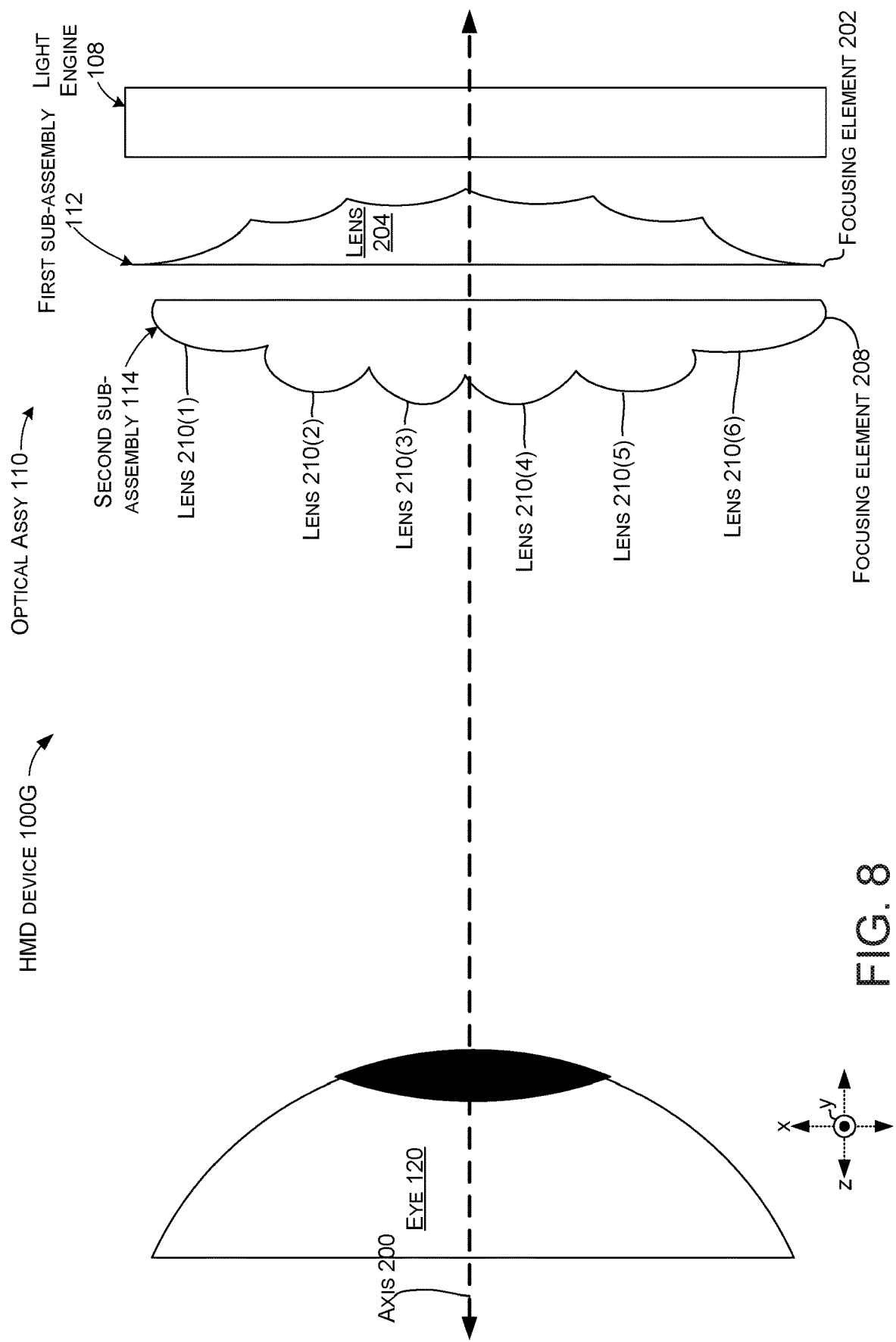
Figure 9:
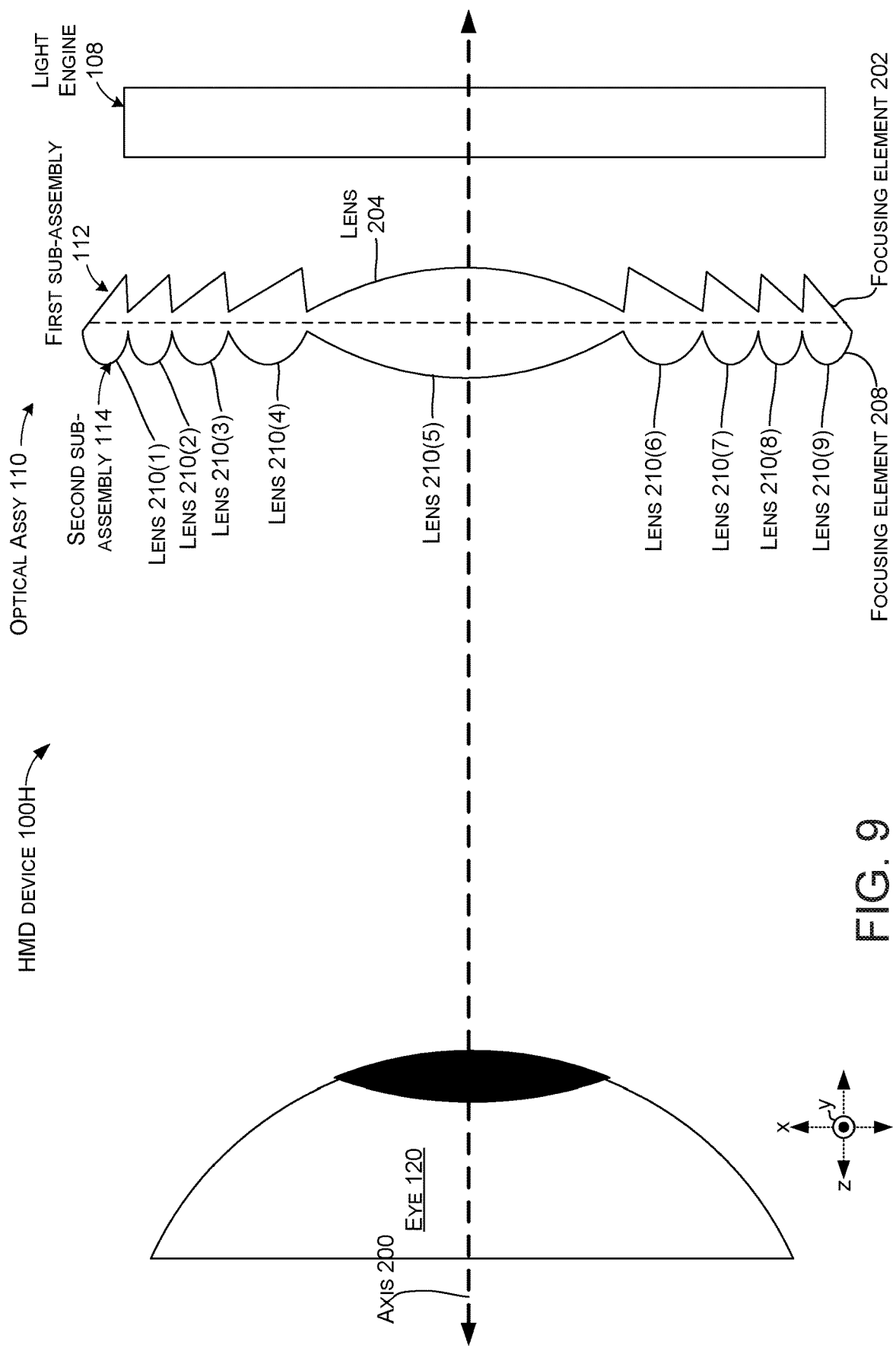
Figure 10:
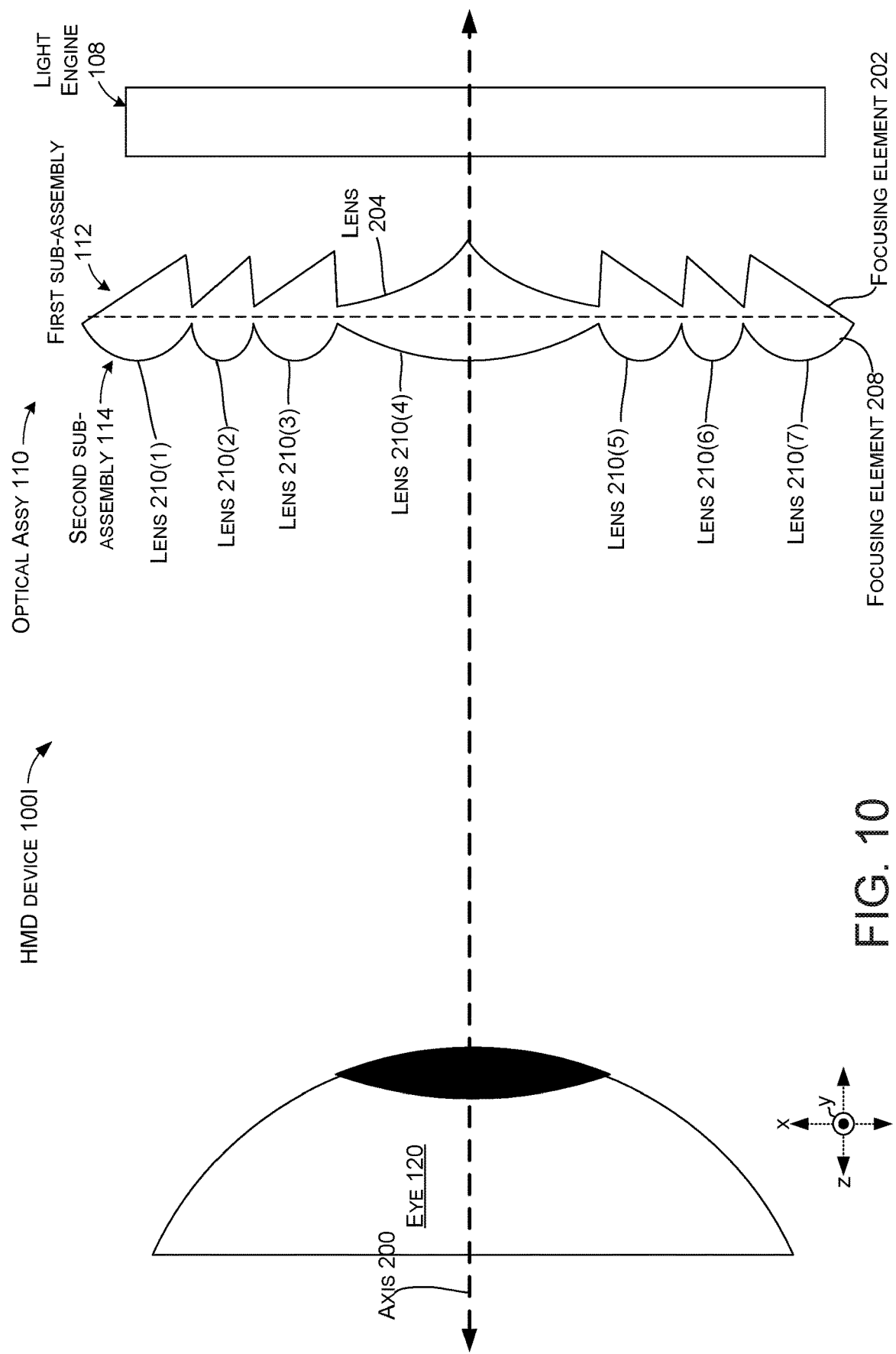

FIG. 5 shows HMD device 100D. In this case, focusing element 202 is manifest as three lenses 204. The central lens 204(2) is oriented parallel to the light engine 108. The peripheral lenses 204(1) and 204(3) are angled slightly toward second sub-assembly 114. Further, the border of lenses 204(1) and 204(2) can be aligned with the border of lens 210(2) and lens 210(3). Similarly, the border of lenses 204(2) and 204(3) can be aligned with the junction of lens 210(4) and lens 210(5) to reduce light that is misdirected between the focusing elements 202 and 208 and thereby does not contribute to the image or degrades the image.

In this implementation, the lenses 210 have dissimilar shapes from one another. In this example, the curvature of lenses 210 is not uniform. In this case, the outer lenses 210(1) and 210(6) have greater curvature, the intermediate lenses 210(2) and 210(5) have intermediate curvature, and the central lenses 210(3) and 210(4) have the least curvature.

FIGS. 6-10 show additional HMD device variations. The large lens 204 facing toward the light engine 108 can work cooperatively with the lenses 210, such as in HMD devices 100E, 100F, 100G, 100H and 100I, respectively. The lenses 204 and 210 can be implemented in a positive or negative configuration. The negative lenses can act as a galilean telescope and increase the effective focal distance of the sub-lens assembly while minimising the thickness of the optical assembly 110.

Figure 11:
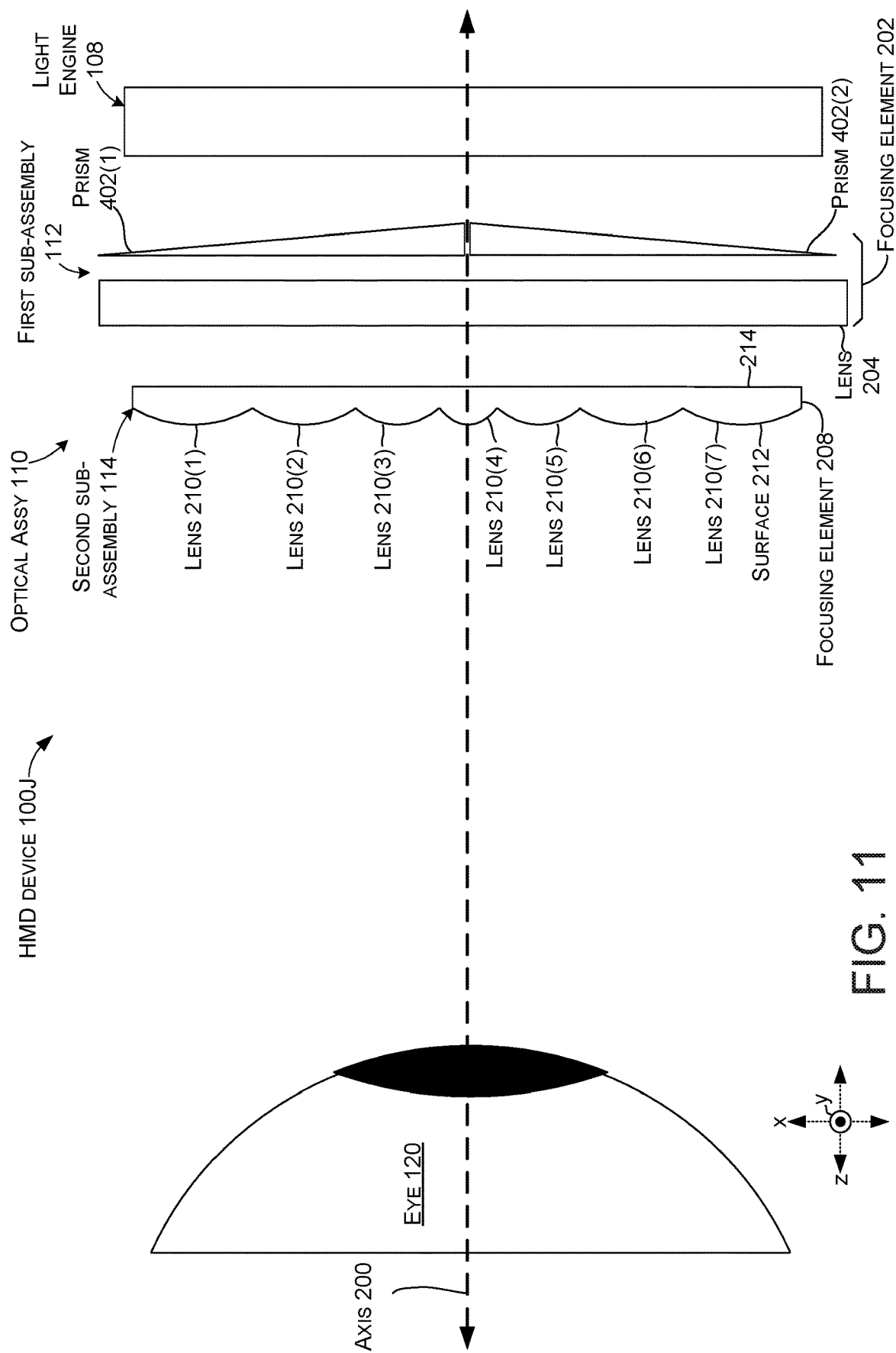

FIG. 11 shows HMD device 100J. In this case, the first sub-assembly 112 is manifest as a flat lens 204 and prisms 402(1) and 402(2). Further, the second sub-assembly 114 is manifest as lenses 210 which have differing sizes. In this case, the central lens 210(4) has a smaller dimension in the xy-reference direction and the lenses get progressively larger with peripheral lenses 210(1) and 210(7) having the largest dimensions.

Figure 12:
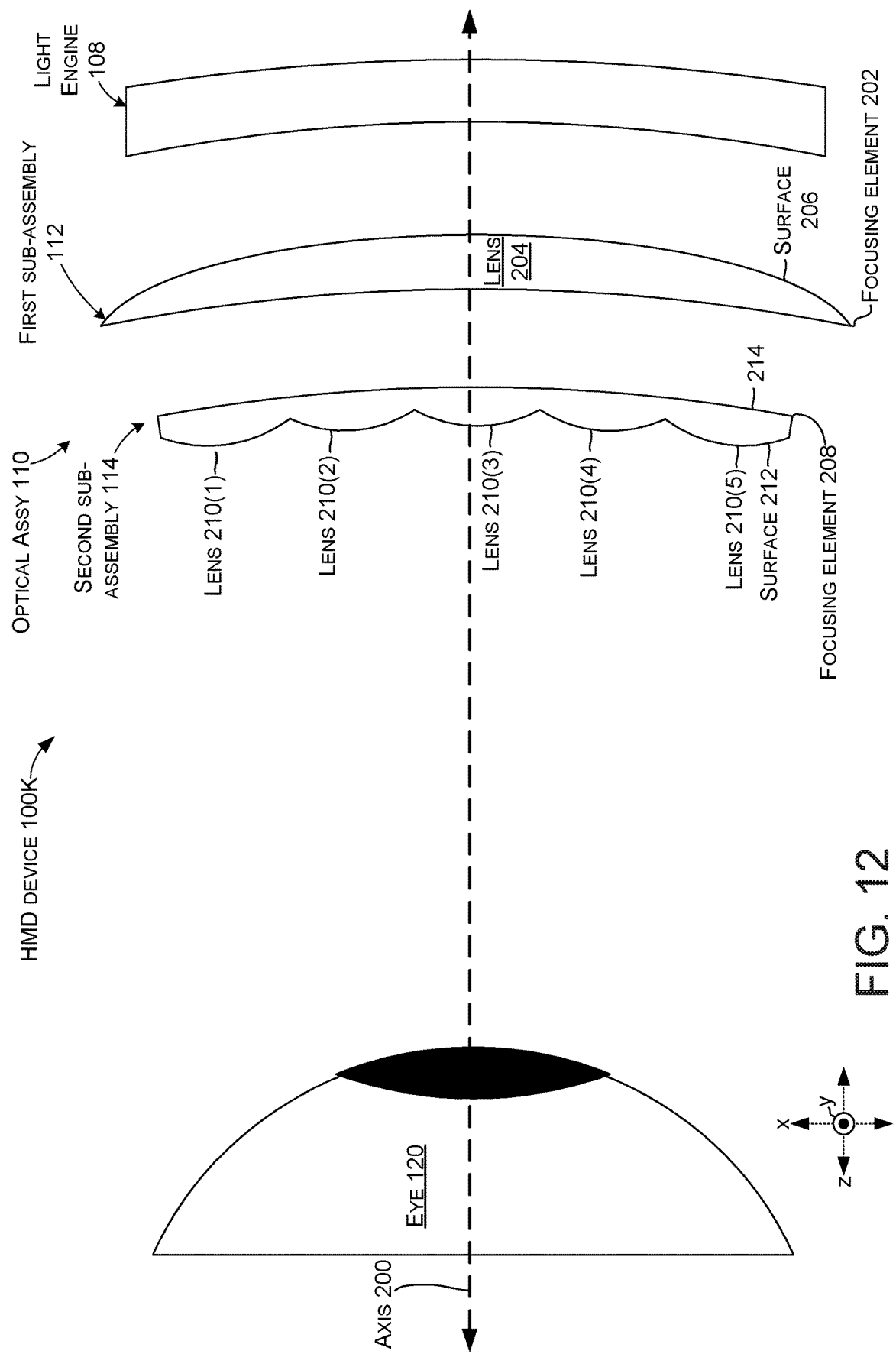

FIG. 12 shows HMD device 100K. In this implementation, the light engine 108 and the optical assembly 110 are slightly curved rather than being planar. Such a configuration can be positioned closer to the user's face and thus may enhance the user experience.

Figure 13:
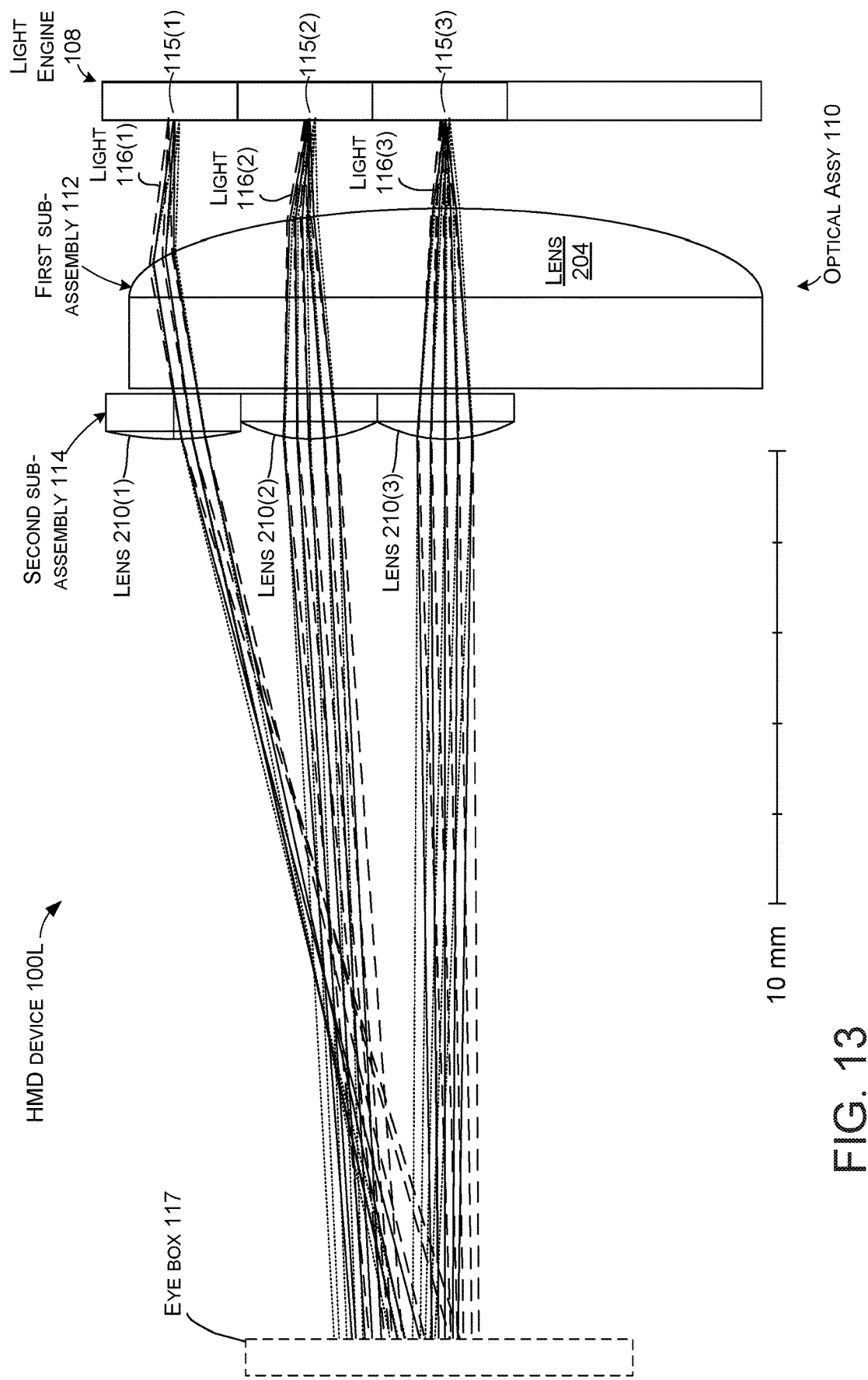

FIGS. 2A-12 schematically illustrate several concepts relative to various example implementations. FIG. 13 shows a dimensionally accurate example HMD device 100L implementation that is consistent with the present concepts. In this implementation, light engine 108 may include an array of independently controllable light emitting elements 115, which may be controlled by controller (FIG. 1B, 122) to emit light. The emitting elements 115 may be arranged such that individual light emitting elements are placed relative to the coplanar lenses 210 of the second sub-assembly. The number of lenses 210 may correspond to the number of elements 115, such as in a one-to-one relation.

Multiple suitable structures are shown in FIGS. 2A-13. Of course, not all contemplated structural variants can be illustrated. The skilled artisan will recognize other structures for achieving the described functionalities described above and below.

Referring collectively at FIGS. 2A-13, some of these implementations can employ multiple coplanar lenses 210 (e.g., mini lenses) on focusing element 208. The multiple lenses 210 can work in cooperation with focusing element 202 to deliver light from the light engine 108 to the eye box 117. In this case, each lens 210 can act as a simple near eye display. The eye box formed by each individual lens is very small, in the order of millimeters, but when added together they can form the overall eye box 117. The lenses 210 can be designed to be sufficiently small so that the eye cannot see the boundaries between the lenses. At the same time, the lenses 210 should not be too small because their Numerical Aperture (i.e. their light collecting power) should be sufficiently large so most of the light 116 from the light engine 108 is collected from the lens and does not end up at the wrong place (and thus decrease contrast).

The multiple coplanar lenses 210 can function in conjunction with focusing element 202. Focusing element 202 can be implemented as a large positive lens 204 as illustrated in FIGS. 2A-3. The lens 204 can be a separate element as illustrated in FIGS. 2A and 2B, for example, or can be integrated with the lenses 210 as illustrated in FIG. 3, for example. One purpose of the focusing element 202 is to act like a prism with a variable angle to bend the light by a different angle depending on the distance from the center of the optical axis 200. In such a configuration, lenses 210 further away from the optical axis will have their light bent by a larger amount. This results in an arrangement where each lens 210 tends to create only the specified FoV, and thus no (or few) light rays arrive outside the desired eye box 117.

Figure 14A:
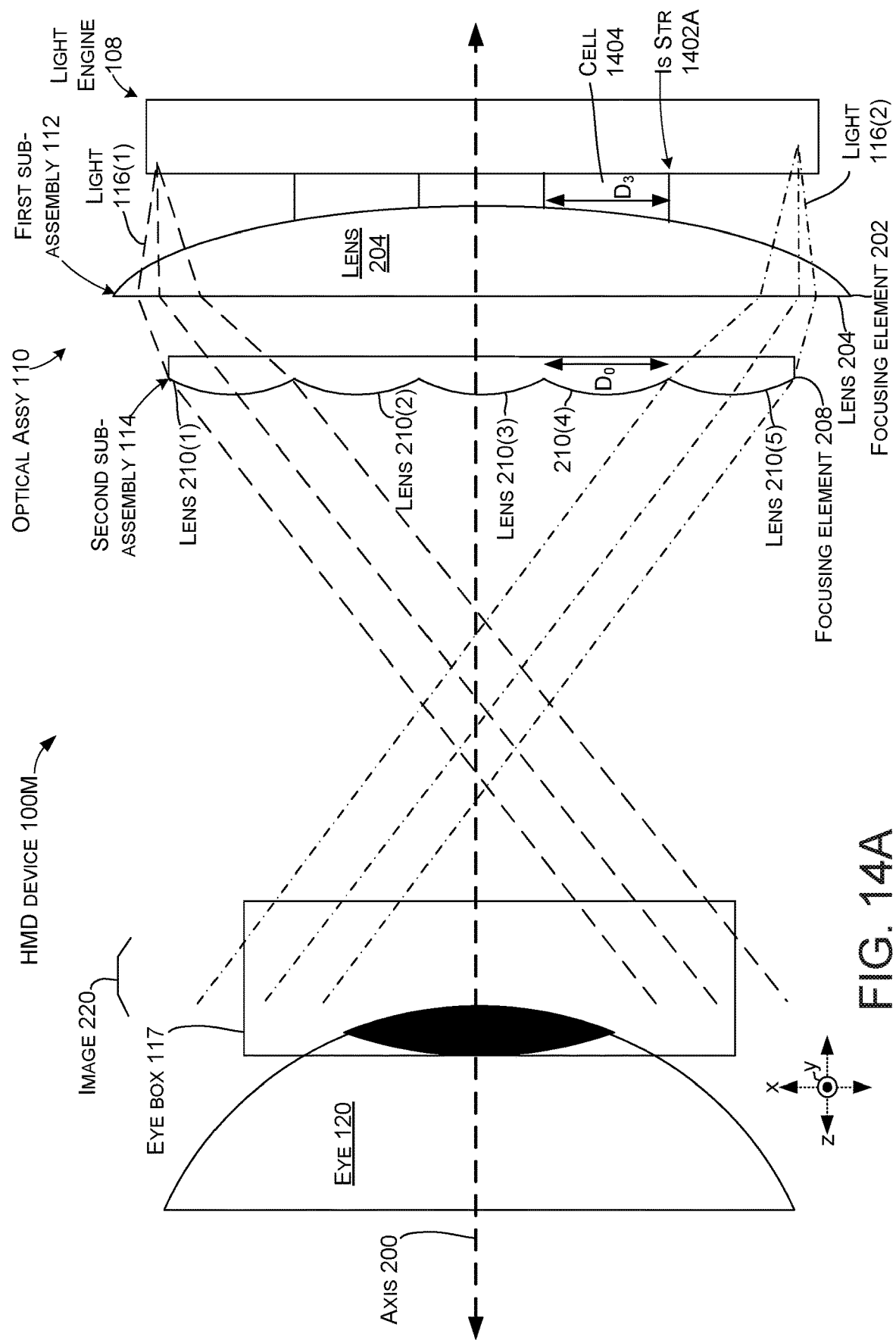
Figure 14B:
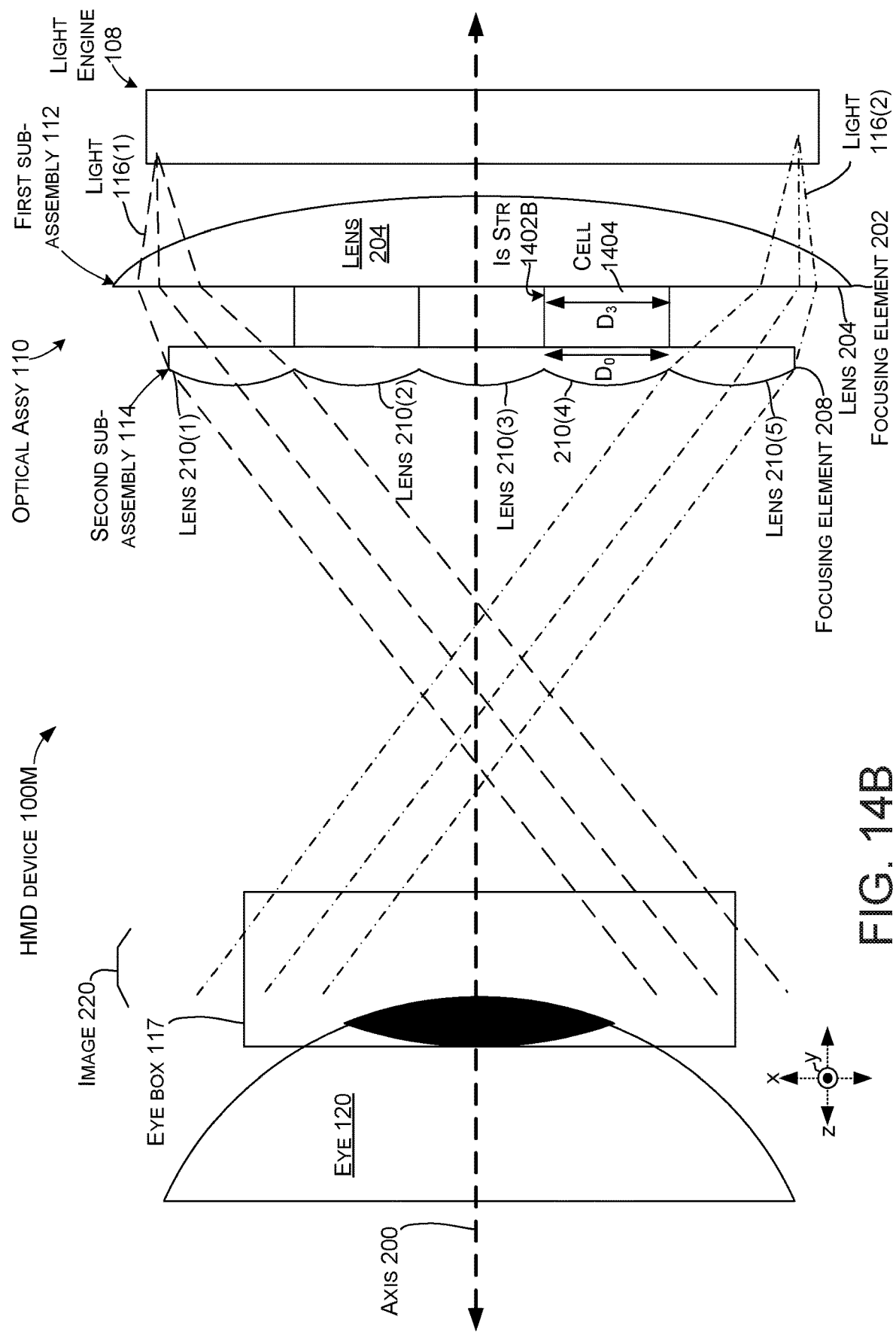
Figure 15:
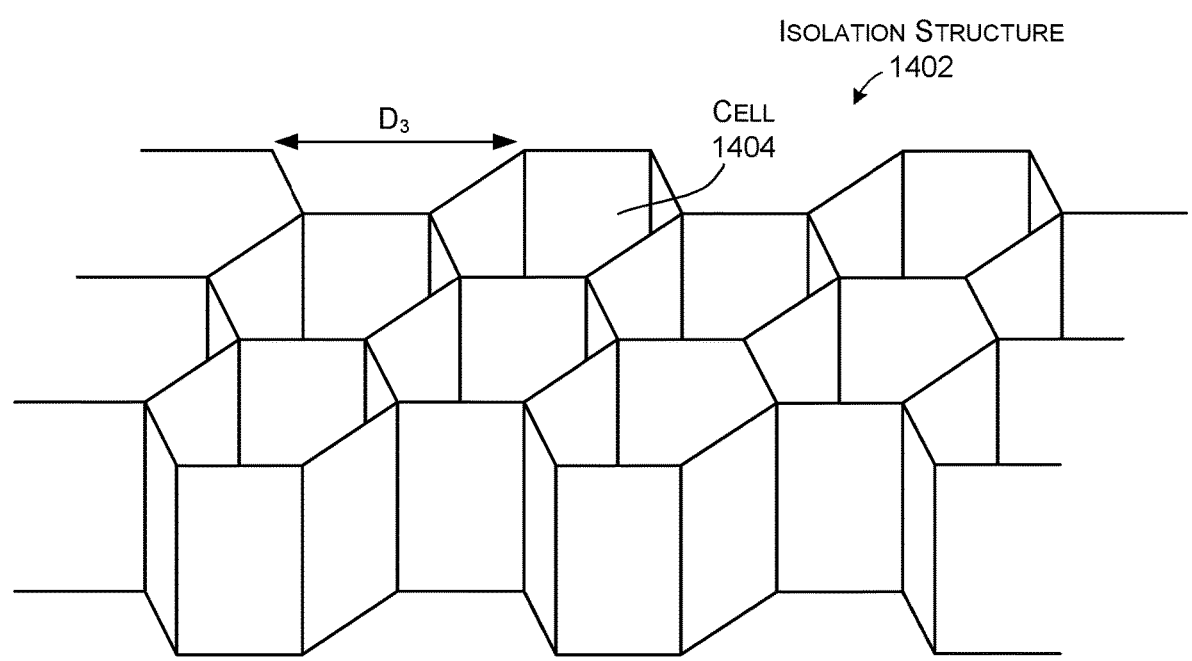
FIG. 15 illustrates a perspective view of an example component of an HMD device that is consistent with some implementations of the present concepts.

FIGS. 14A, 14B, and 15 collectively introduce another of the present concepts. FIGS. 14A and 14B show an HMD device 100M that is similar to HMD device 100A of FIGS. 2A and 2B. HMD device 100M also includes an isolation structure 1402. In the implementation of FIG. 14A, the isolation structure 1402A is positioned between the light engine 108 and the first sub-assembly 112. In the implementation of FIG. 14B, the isolation structure 1402B is positioned between the first sub-assembly 112 and the second sub-assembly 114. The isolation structure 1402 can reduce or eliminate crosstalk between adjacent lenses 210. Crosstalk can degrade image quality. Stated another way, the isolation structure can block light waves intended for one lens 210, such as lens 210(1) from reaching an adjacent lens 210, such as lens 210(2). In some configurations, the isolation structure 1402 can define cells 1404 (e.g., optically transparent regions) that can have dimensions that are approximately equal to, and aligned with, individual lenses 210. The cells can be separated by optically opaque regions (e.g., walls). For instance, dimension $D_3$ of the cells 1404 can match dimension $D_0$ of the lens 210(4). From one perspective, the isolation structure can be employed to ensure that light from specific pixels are only received by intended individual lenses 210.

FIG. 15 shows an example isolation structure 1402. In this case, the cells 1404 are arranged as hexagonal cells 1404 (e.g., honeycomb structure) for use with correspondingly sized hexagonal lenses 210. Other shapes are contemplated. In some implementations, the isolation structure can be positioned and/or patterned on the first sub-assembly 112 and/or the second sub-assembly 114 utilizing various techniques, such as photolithography, for example.

Recall that the discussion above relative to FIGS. 2A-13 explains how a relatively large eye box can be obtained by the combined use of focusing element 202 and focusing element 208, with the latter employing multiple coplanar lenses 210. The present concepts provide additional opportunities to control the size and/or composition of the eye box 117. A way to increase the eye box is to create "holes" in the eye box, and thus save bandwidth. Because the pupil of the eye can be relatively large compared to the coplanar lenses 210 used in the focusing element 208, it is possible to break the eye box into groups or sections with different sections forming different portions of the overall eye box 117 (e.g., when designed appropriately the holes tend to be imperceptible to the user). This aspect is discussed in more detail relative to FIG. 16.

Figure 16:
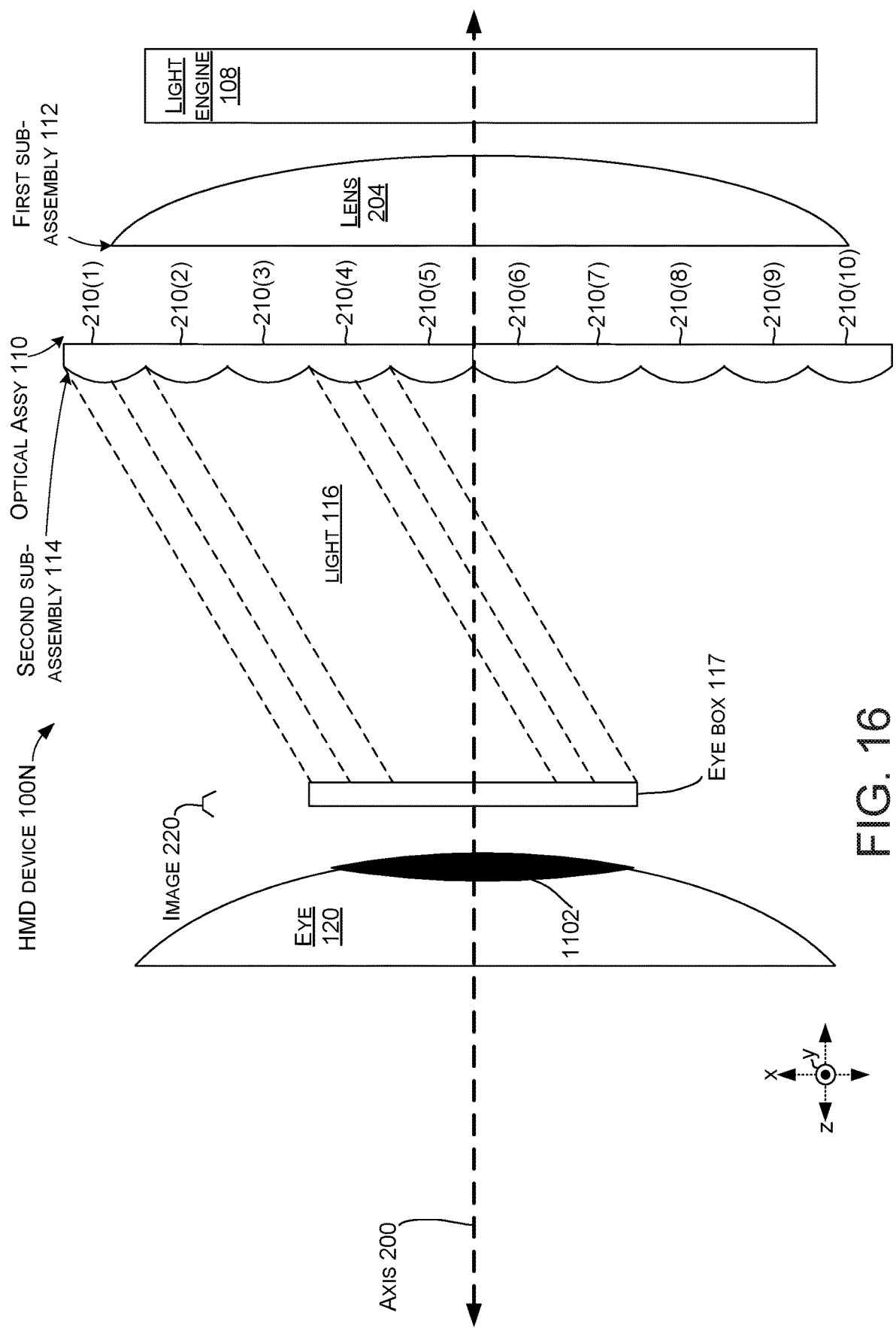

FIG. 16 shows an HMD device 100N. An example of the bandwidth saving "holes" introduced above is explained relative to HMD device 100N. In this case, lenses 210 can be operated as three groups, for example. (Other size groups can be employed). The first group can include lenses 210(1), 210(4), 210(7), and 210(10), the second group can include lenses 210(2), 210(5), and 210(8), and the third group can include lenses 210(3), 210(6), and 210(9). The lenses of each group can create the entire eye box 117 for a specific image pixel. If the group of lenses 210 is small enough (i.e. similar size as the eye lens 1102), the user will not observe any gaps in the FoV or eye box 117. Within a group, each lens 210 can create a different part of the eye box. In the illustrated example lenses 210(1) and 210(4) contribute to the eye box. However, additional bandwidth savings can be obtained because lenses 210(7) and 210(10) do not contribute to the eye box and light that would be received by these lenses need not be generated by the light engine 108.

Stated another way, some of the described implementations can entail a large positive lens 204 used in tandem with the multiple coplanar lens 210. At least one purpose of lens 204 is to focus the light into the user's eye and thus create the desired large FoV. At least one purpose of the multiple coplanar lenses 210 can be to collimate the light beam further and create a bundle of parallel light rays. In some cases, the multiple lenses 210 could be grouped in clusters or groups of three lenses, for example, with each lens 210 of the group creating part of the eye box 117. In this way, the eye box 117 can be as big if not bigger than the group of the three lenses 210. Note that the eye box 117 can be even bigger than the cluster size, because small gaps in the eye box 117 are unperceivable to the human eye.

Figure 17:
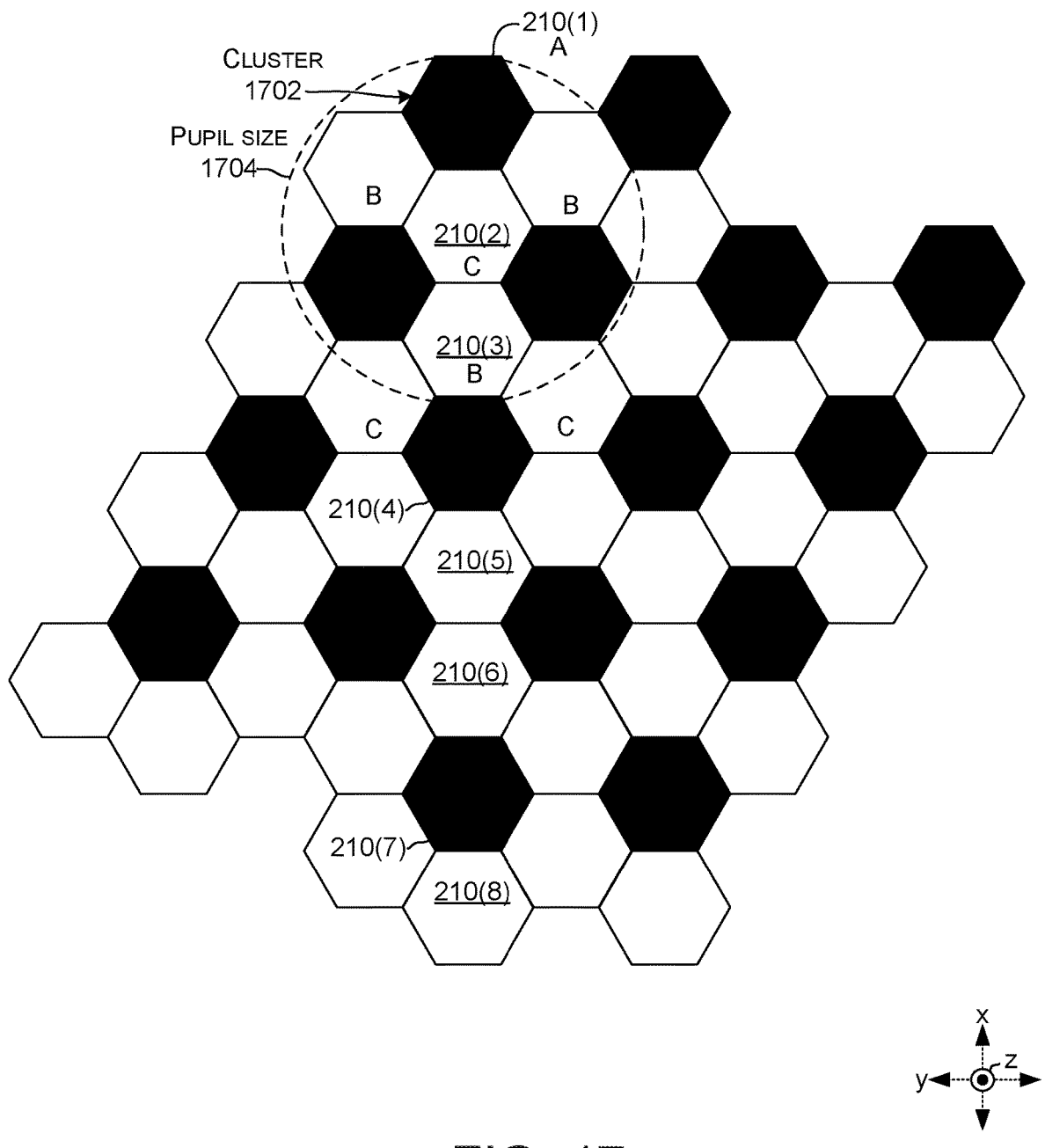
FIGS. 17 and 18 illustrate elevational views of example components of an HMD device that are consistent with some implementations of the present concepts.

FIG. 17 shows a potential eye box 117 formed when a cluster or group 1702 of three lenses 210 is used to form the eye box, as indicated by cluster "A," cluster "B," and cluster "C." Each highlighted hexagon can correspond to the positions in the eye box where the user can see the image of a single pixel. As the size of the pupil of the eye, which is indicated at 1704, is larger than the spacing of the holes in the eye box, the user is unlikely to perceive the gaps in the eye box. Note that this pattern can change (shift and/or scale) for each pixel on the image plane, making it less likely for the user to perceive the gaps in the eye box.

Each cluster 1702 of lenses 210 may form the entire virtual image. Further, each lens 210 within each cluster may be configured to form a different part of the virtual image. For example, lens A may form a first part of the virtual image, lens B may form a second part of the virtual image, and lens C may form a third part of the image, such that the cluster of lenses A, B, and C cooperatively form the entire virtual image. The plurality of clusters 1702 can cooperatively form the field of view and the eye box provided to the user's eye. Furthermore, the clusters 1702 may be repeated to increase the eye box size.

Figure 18:
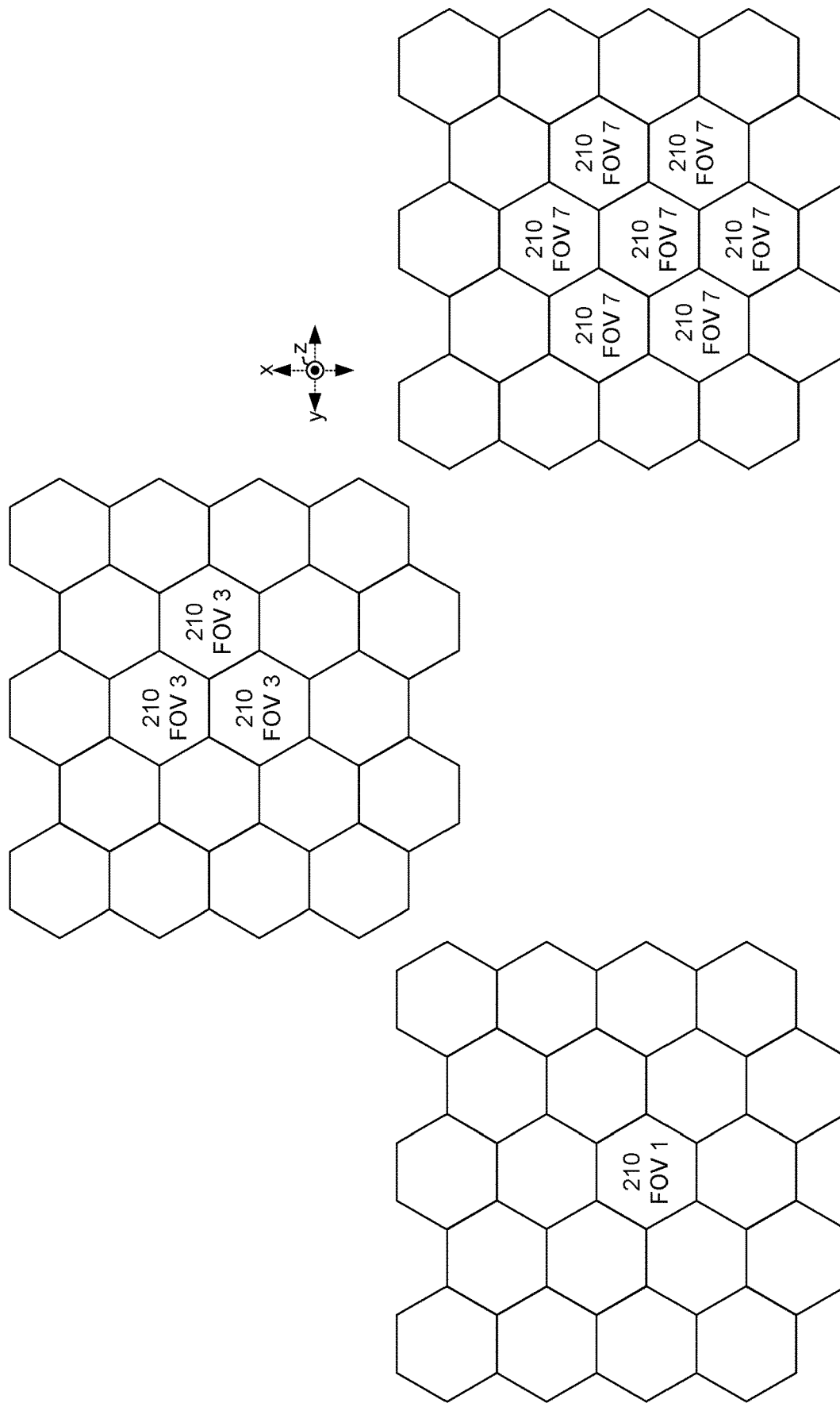

FIG. 18 shows three potential configurations to form the eye box 117 from lenses 210 as a hexagonal 1 pattern on the left, hexagonal 3 pattern in the center (similar to FIG. 17), and a hexagonal 7 pattern on the right. In the hexagonal 1 pattern on the left, a single lens 210 labeled 'FOV 1' can form the entire image. The other lenses can increase the eye box. In the illustrated configurations, the lenses 210 have a regular pattern or packing shape, other configurations can have an irregular packing that changes shape and size depending on the position of the pupil. For example, in the center of the eye box, the spacing may be large, because the lens of the eye is parallel to the display while near the edges the spacing can be smaller. The resolution may be optimized for the center in some implementations.

Recall that rather than forming the eye box uniformly, information about the user's eye may be used to dynamically customize eye box formation. With fast eye tracking, the actual path between the light engine and the eye can be determined. Given that each pixel of the light engine can emit light in a Lambertian or other desired pattern, rays from a single pixel will pass through different paths in the optics of the optical assembly. The exact image perceived by the user can be enhanced by knowing which path or paths the light takes and displaying an appropriate image on the light engine 108. This can be enhanced in several way, two of which are described below relative to FIG. 19.

Figure 19:
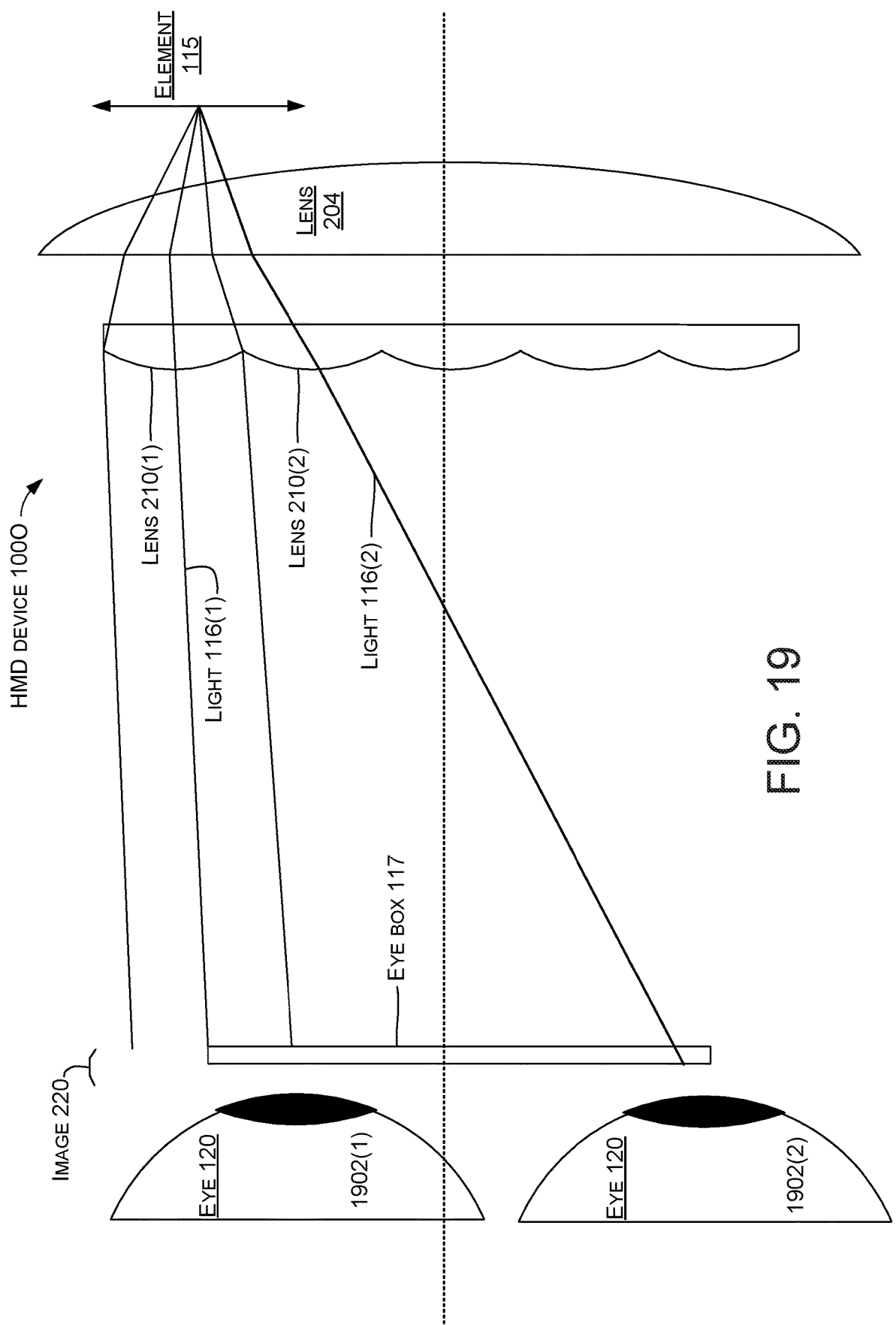

FIG. 19 shows another HMD device 100O. In this case, for purposes of explanation, the user's eye 120 is shown in two alternative locations 1902(1) and 1902(2) relative to the eye box 117. Assume for purposes of explanation, that the user's eye is at location 1902(1).

In the first enhancement technique, assume that light 116 from a specific pixel, e.g., from light emitting element 115 is intended to go through lens 210(1) as light 116(1) but some of the light 116(2) goes through the wrong lens (e.g., lens 210(2)) and sends light to an unwanted angle that will not be visible to the user. In some implementations, the specific pixel can be switched off (if possible) or its contribution considered in the image and possibly another image to be dimmed. In this way, the negative effect in the image 220 can be reduced and contrast and ghost images can be reduced.

In the second enhancement technique, the crosstalk between pixels can be used to increase the eye box 117. Note that light 116(2) passing at such an oblique angle is likely to be aberrated. However, especially in the periphery where the human resolution is low, it can be used to increase the eye box if the user's eye is at location 1902(2). This is possible because outside the foveal region, the eye does not have the acuity to detect the aberration.

From one perspective, the present concepts can offer techniques for simplifying overall HMD device design. Toward this end, each lens 210 can be evaluated separately and techniques employed to try to reduce/minimize the burden on each lens 210. This can be accomplished with different simplifying techniques. Several of these simplifying techniques are described collectively below relative to FIGS. 20A-20D.

Figure 20A:
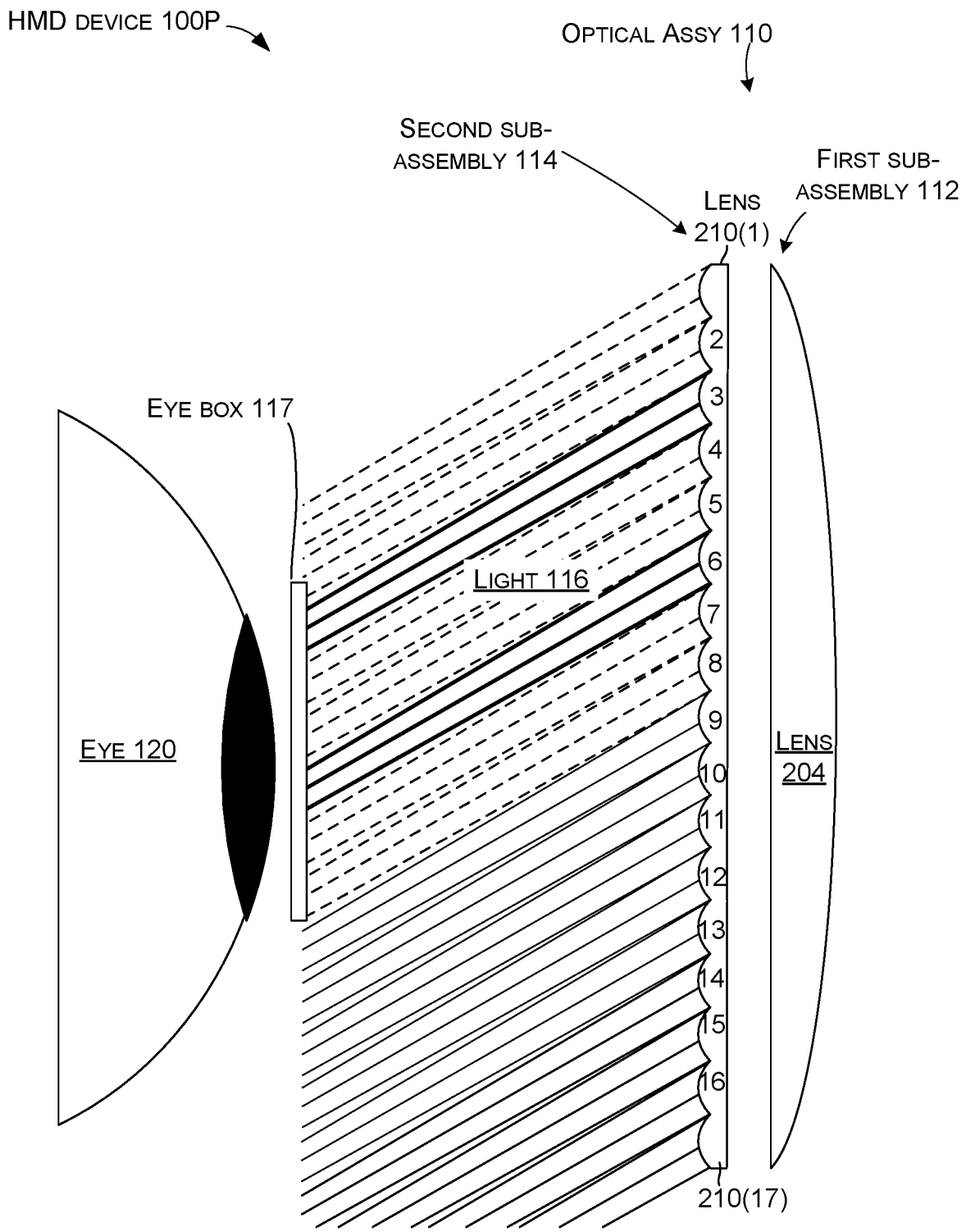

For purposes of explanation, FIG. 20A shows light 116 emerging from the optical assembly 110 of HMD device 100P without the application of any of simplifying techniques. Different line types (e.g., solid lines, dashed lines, and dotted lines) represent different light rays from a single pixel. All of the light rays are approximately parallel when emerging from the optical assembly 110.

Figure 20B:
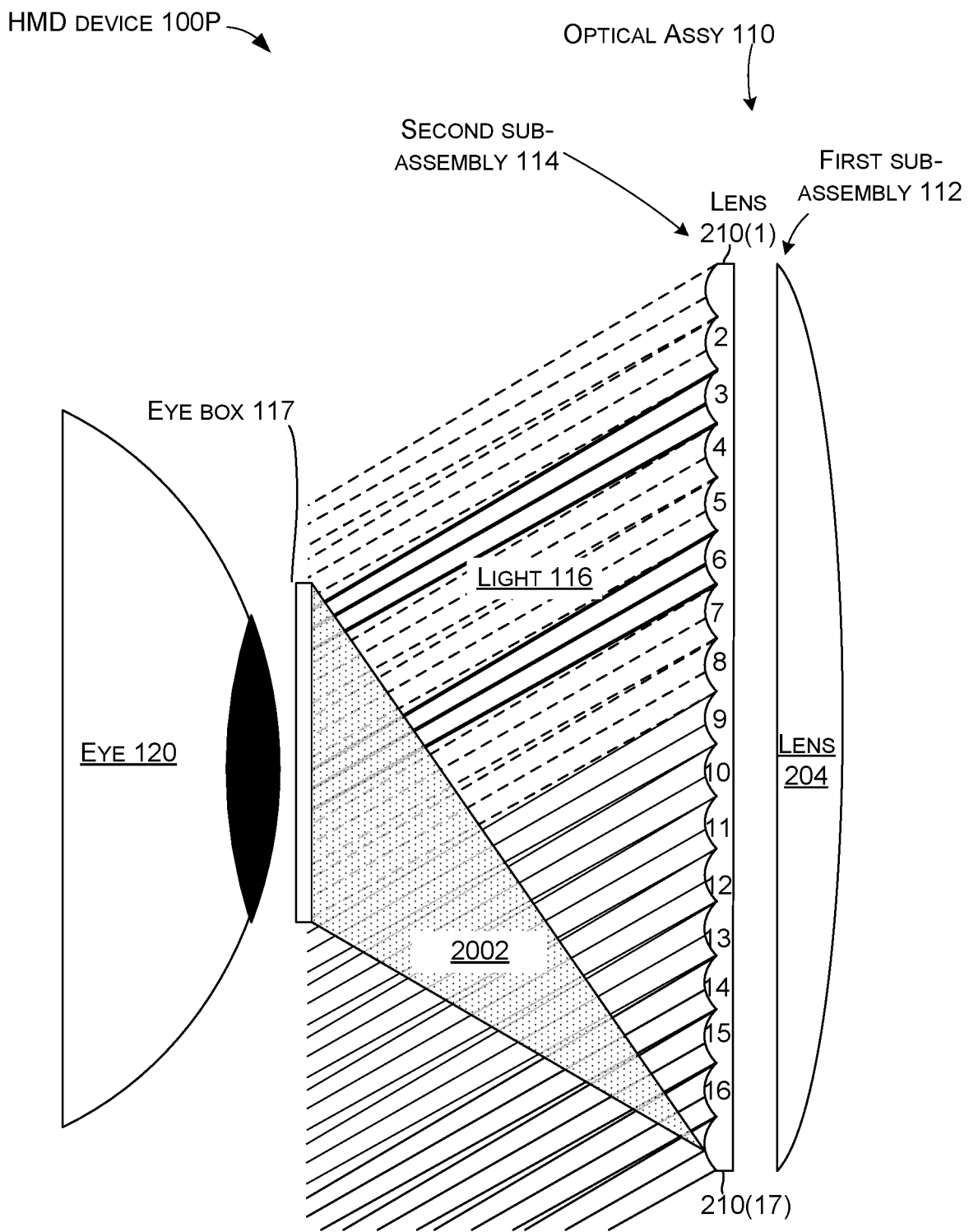

FIG. 20B relates to a first simplifying technique. Here, the burden on individual lenses 210 can be reduced by looking at which rays arrive into the eye box 117; i.e. the area where the eye 120 is most likely to be or confirmed to be via eye tracking. In relation to the bottom lens 210(17), only a small range of ray-angles indicated at 2002 will arrive in the eye box 117. Therefore, for that specific lens 210(17) its FoV can be reduced to the perceivable FoV (represented by ray angles 2002). In this way, the reduced FoV can have better performance compared to a traditional case where lens 210(17) had to create the entire FoV. Thus, this aspect can be considered when driving pixels of the light engine that would generate light rays that would be received at lens 210(17).

Figure 20C:
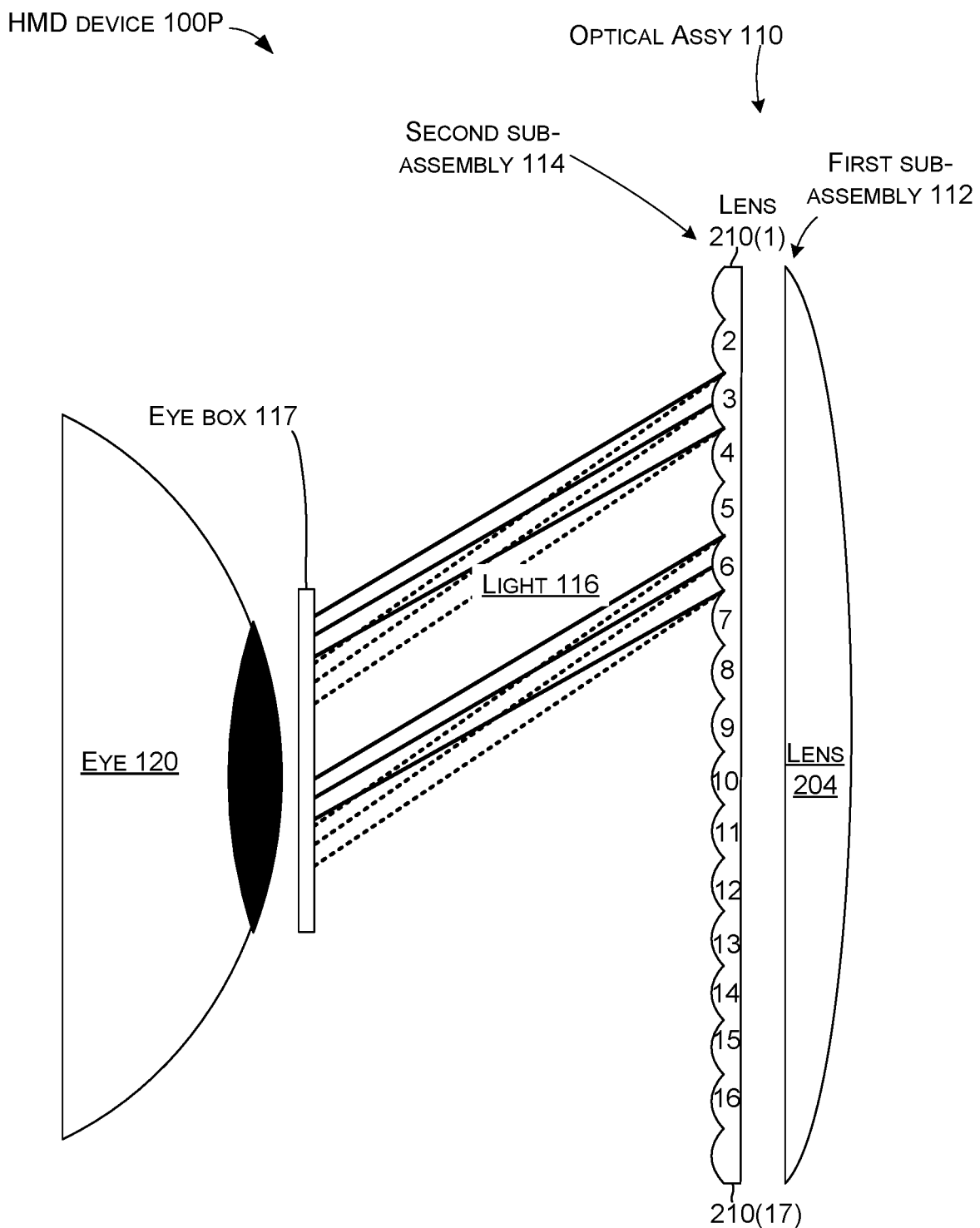

FIG. 20C relates to a second simplifying technique. The second simplifying technique was introduced in the discussion above relative to FIGS. 16-18. This second simplifying technique relates to distributing the FoV over a number of lenses 210, such as three lenses in this example. In this case lenses 210(1), 210(4), 210(7), etc. form a first subset of lenses, lenses 210(2), 210(5), 210(8), etc. form a second subset of lenses, and, lenses 210(3), 210(6), 210(9), etc. form a third subset of lenses. This technique impacts both the FoV and the eye box at the same time. In a simple case, the image is segmented into three parts. Assume for purposes of explanation that the image is a 300×100 pixel image. The simplifying technique can split the image into three 100×100 segments.

Each segment can be displayed behind a single lens 210 so three lenses of the multiple lenses 210 will display the entire image. So, the specific pixel will only be rendered by every third lens (thick solid lines). (This aspect is also illustrated in FIG. 16 where lenses 210(1) and 210(4) would render the pixel, but intervening lenses 210(2) and 210(3) render different pixels). Thus, relative to FIG. 20C, lenses 210(3) and 210(6) contribute the thick solid lines, but intervening lenses 210(4) and 210(5) contribute a different part of the image and thus, in this example, they do not display the "thick solid lines" relating to the pixel. Looking at the light rays in the eye box, this can create gaps in the eye box. However, as mentioned above human eyes tend to have a minimum diameter of ~3 mm, and constantly move, so this does not become an issue. By creating these holes into the eye box, this simplifying technique can effectively reduce the FoV of each lens 210 by a third. In this way, the performance of individual lenses 210 can be better for the specific part of the FoV that it creates. One interesting aspect of these eye box holes, is that they are all at different positions depending on the pixel that is ON. This can be a bonus as the eye is even more likely to observe a slight discontinuity in the eye box (or intensity variation) if it is for a single pixel.

Figure 20D:
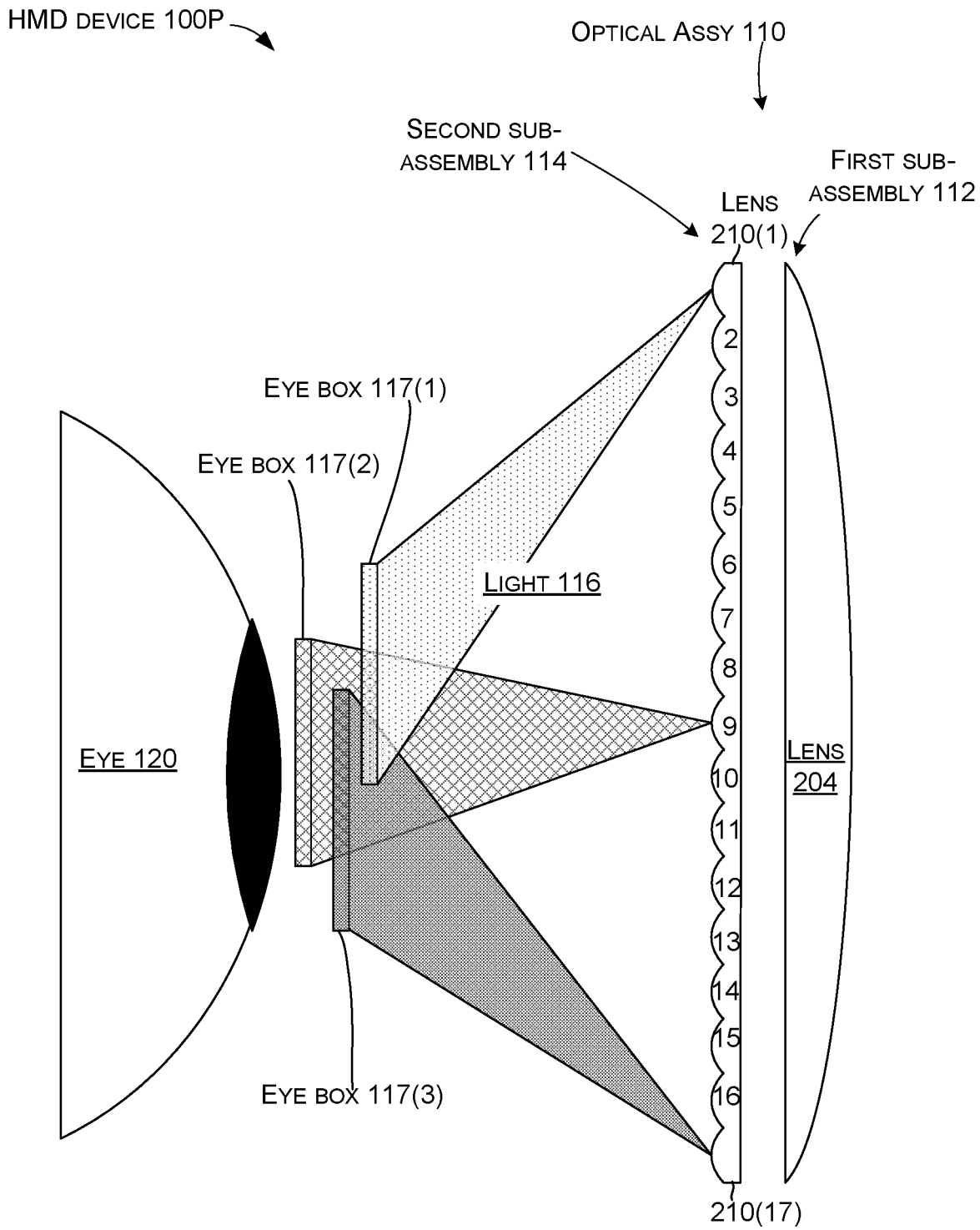

The final simplifying technique, is a combination of the two simplifying techniques described relative to FIGS. 20B and 20C. This simplifying technique involves having an eye box 117 that is different for each part of the FoV. This is shown in FIG. 20D illustrated relative to lenses 210(1), 210(9), and 210(17). The contribution of each of these lenses to the overall eye box is defined by their FoV. From the perspective of individual lenses 210, they reduce their FoV and thus improve their performance in the FoV that they actually use. Thus, from a macro perspective, the total number of lenses 210 can be divided into a number of subsets. Individual subsets can contribute to only a portion of the overall image. Within a subset, the contribution of an individual lens can depend upon the field of view relative to that lens. By contributing less of the overall image, the individual lenses can contribute a higher resolution to the portion to which they do contribute.

The above simplifying techniques can leverage the fact that at any one time, only a small section of the eye box may be utilized based on the user's eye position and/or gaze direction. Thus, rather than generating the image that encompasses the entire eye box equally, the image can be customized to the eye position and FOV. Such techniques can save expensive processing that can otherwise be required in order to ensure that a high-quality image is visible throughout the entire area of the eye box. Yet due to the eye's foveated nature, much of this expensive processing is wasted, as a user can typically only perceive a small portion of the image corresponding to the pupil's line of sight in high resolution, while peripheral areas of the eye have lower perceptive power. As such, by determining the pupil position and gaze direction of a user's eye, the HMD device would not be required to produce a high resolution image over the entire eye box, and optimization processing can be reserved for a limited area corresponding to the pupil position and gaze direction of the user's eye, while the remaining peripheral areas of the image can utilize a lower image quality.

To account for the changing position of the pupil, eye-tracking can determine the appropriate pupil position and gaze direction of the user's eye, and pixels can be controlled in relation to individual subsets of the lenses 210 to provide an optimized image that corresponds to the eye position, rather than needing to generate an optimized image over the entire eye box. For example, in an HMD device that does not utilize eye tracking, the device may be required to optimize an image over an eye box that can span up to 20 mm, while introducing eye tracking can reduce the optimization space to 5 mm, preventing unnecessarily expensive processing. Alternatively or additionally, not generating light that does not contribute to the user's vision can reduce light clutter within the HMD device and thereby enhance contrast and perceptibility of the light rays that are perceived by the user. Additionally, the advantages offered by clustering the lenses 210 can be utilized to correct for aberration that may be exhibited by the optical elements used in the HMD device.

Accordingly, some implementations disclosed herein are directed to an HMD device that can utilize an eye-tracking unit to determine a pupil position and gaze direction of a user's eye. Based at least on the data from the eye-tracking unit, the light engine can be controlled to leverage flexibility offered by the tandemly arranged first and second sub-assemblies and the multiple coplanar lenses of the second sub-assembly to customize light delivery to the eye box.

Figure 21:
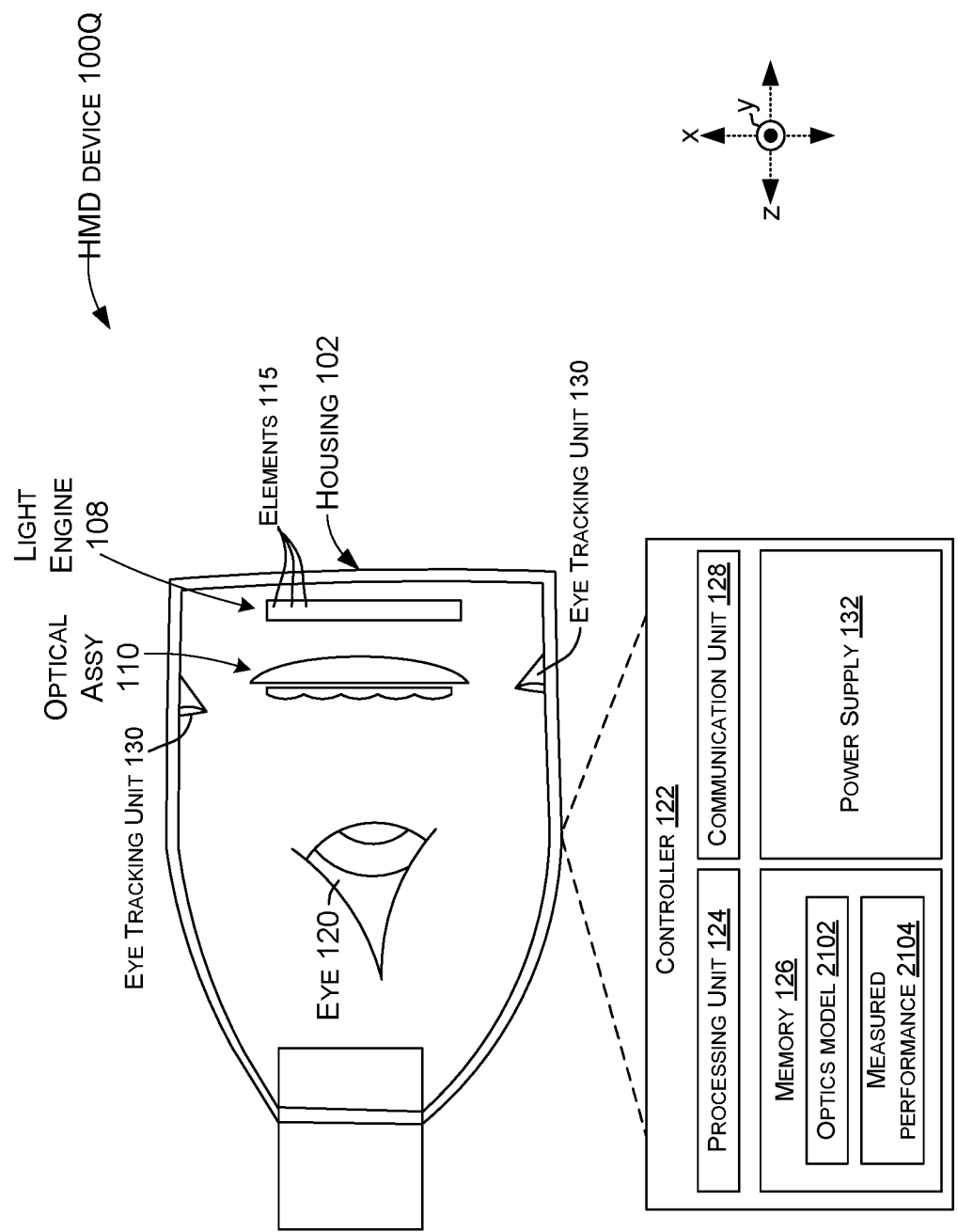

FIG. 21 shows an HMD device 100Q that is similar to HMD device 100 described above relative to FIGS. 1A and 1B and as such, not all components will be re-introduced here. As in that case, HMD device 100Q includes housing 102 that positions the light engine 108 and optical assembly 110 in line with the user's eye 120 along the optical axis (not shown). Eye tracking units 130 can be positioned on the housing 102 and directed toward the user's eye to detect eye position, gaze direction, and/or pupil size, among others.

The storage/memory 126 can include an optics model 2102 and/or measured performance (e.g., deviation data) 2104. The optics model 2102 can be derived from the design specifications of the HMD device and can be utilized to predict how illumination of individual elements 115 (e.g., pixels) will be received by and emerge from the optical assembly 110 to contribute to the eye box.

The measured performance can be obtained in a testing scenario, such in a laboratory or manufacturing facility. The measured performance can be obtained by placing a relatively large photosensor on the optical axis at specific distances from the optical assembly. The relatively large photo sensor, could be twice as large as the size of the eye box predicted from the optics model, for example. Each element 115 could then be driven at specific parameter values. The optics model will predict the location and intensity of the resulting light rays. Any deviation from the predicted values (e.g., 'correction data') could be stored in the memory in various ways. In one case, a deviation between the predicted value and the measured value could be stored as part of the measured performance.

This testing process can be repeated at various parameter values (e.g., intensities) for each emitting element 115 in isolation. The process can be repeated for each emitting element 115 in isolation and/or for any combination of emitting elements. The testing process could be performed directly on the HMD device 100L. Alternatively, the testing process could be performed on one or more devices having a common design specification (e.g., a device model) and then stored on other HMD devices of that model.

The controller 122 can receive image data, such as from a virtual reality application, such as a game. The controller can process the image data in light of the optics model 2102 and/or the measured performance data 2104 and the techniques described above relative to FIGS. 9-15D to determine parameter values for driving the elements 115 of the light engine to produce a corresponding image for the user. Stated another way, the controller 122 can access a mapping table that associates image data to parameter values for the elements. The controller can adjust the parameter values that it drives the light engine to account for deviations from the expected performance of the optical assembly.

In some implementations, the controller 122 may also employ a feedback mechanism when determining how to display images. For example, a neural network could be utilized that could determine the existence of certain aberrations for specific images, and through machine learning, could determine appropriate parameter values to drive individual elements 115 of the light engine 108 in order to correct for such aberrations. Equally, the neural network could utilize the eye-tracking information to deduce which individual elements should be activated or deactivated to ensure that high quality light rays are received at the user's eye.

The term "device", "computer," "computing device," "client device," "server," and or "server device" as possibly used herein can mean any type of device that has some amount of hardware processing capability and/or hardware storage/memory capability. Processing capability can be provided by one or more hardware processing units 124 and/or other processors (e.g., hardware processing units/cores) that can execute computer-readable instructions to provide functionality. Computer-readable instructions and/or data can be stored on persistent storage or volatile memory. The term "system" as used herein can refer to a single device, multiple devices, etc.

Memory 126 can be storage resources that are internal or external to any respective devices with which it is associated. Memory 126 can include any one or more of volatile or non-volatile memory, hard drives, flash storage devices, and/or optical storage devices (e.g., CDs, DVDs, etc.), among others. As used herein, the term "computer-readable media" can include signals. In contrast, the term "computer-readable storage media" excludes signals. Computer-readable storage media includes "computer-readable storage devices." Examples of computer-readable storage devices include volatile storage media, such as RAM, and non-volatile storage media, such as hard drives, optical discs, and flash memory, among others, which may constitute memory 126.

In some cases, the devices are configured with a general-purpose hardware processor and storage resources. In other cases, a device can include a system on a chip (SOC) type design. In SOC design implementations, functionality provided by the device can be integrated on a single SOC or multiple coupled SOCs. One or more associated processors can be configured to coordinate with shared resources, such as memory, storage, etc., and/or one or more dedicated resources, such as hardware blocks configured to perform certain specific functionality. Thus, the term "processor," "hardware processor" or "hardware processing unit" as used herein can also refer to central processing units (CPUs), graphical processing units (GPUs), holographic processing units (HPUs), controllers, microcontrollers, processor cores, or other types of processing devices suitable for implementation both in conventional computing architectures as well as SOC designs.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

In some configurations, any of the modules/code discussed herein can be implemented in software, hardware, and/or firmware. In any case, the modules/code can be provided during manufacture of the device or by an intermediary that prepares the device for sale to the end user. In other instances, the end user may install these modules/code later, such as by downloading executable code and installing the executable code on the corresponding device.

Also note that the components and/or devices described herein can function in a stand-alone or cooperative manner to implement the described techniques. For example, the methods described herein can be performed on a single computing device and/or distributed across multiple computing devices that communicate over one or more network(s). Without limitation, such one or more network(s) can include one or more local area networks (LANs), wide area networks (WANs), the Internet, and the like.

Example Adaptive Optics Processing Method

Figure 22:
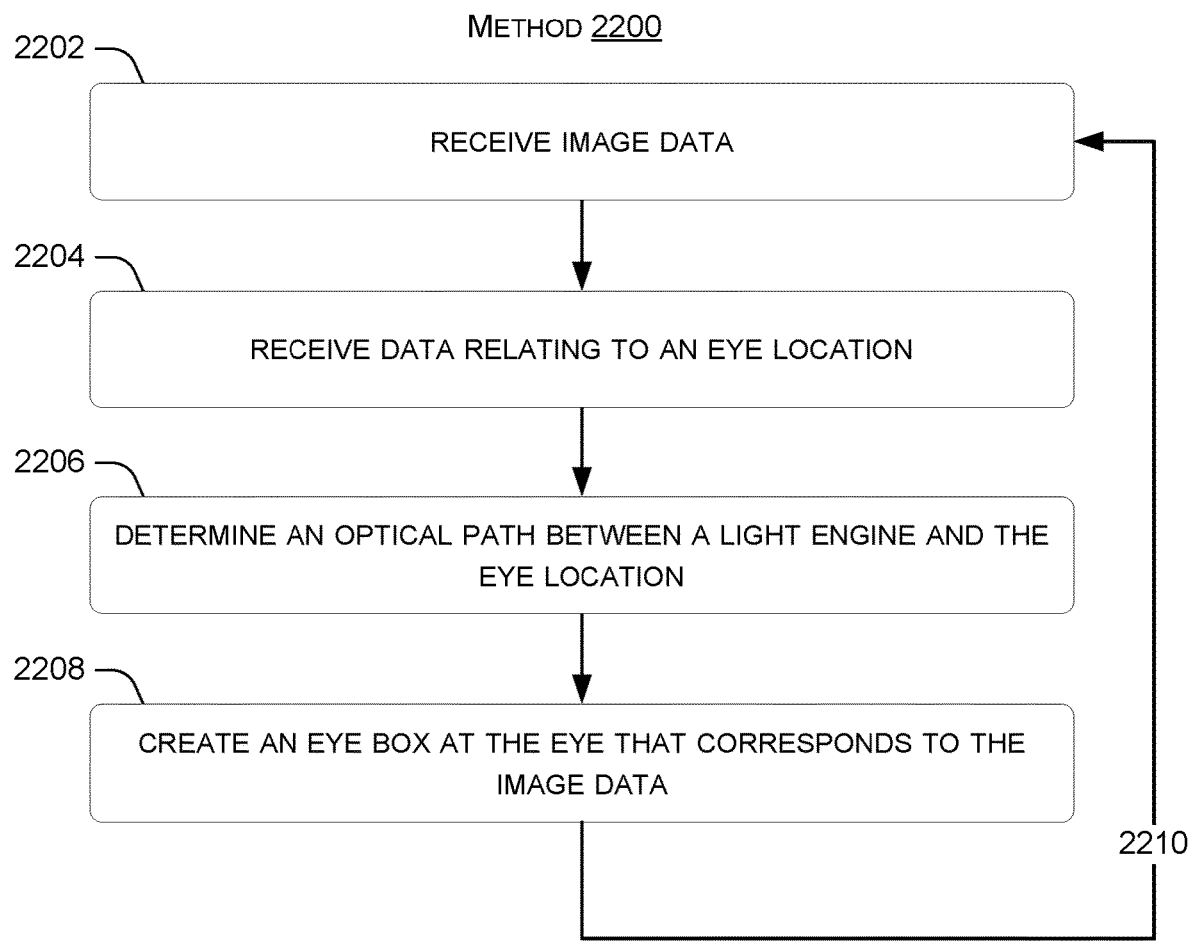
FIG. 22 illustrates an example method or technique that is consistent with some implementations of the present concepts.

The following discussion presents an overview of the functionality associated with controlling tandem optical sub-assemblies and associated micro lenses described above. FIG. 22 illustrates an example method 2200, consistent with the present concepts. Method 2200 can be implemented by a single device, e.g., HMD device 100, or various steps can be distributed over one or more servers, client devices, etc. Moreover, method 2200 can be performed by one or more components, such as controller 122 and/or by other components and/or devices.

At block 2202, the method can receive image data. The image data could be received from a virtual reality application running on an HMD device and/or from a cloud-based application that is communicatively coupled to the HMD device, among other examples.

At block 2204, the method can receive data relating to an eye location. The eye location information can be obtained via various eye tracking technologies. The data can relate to relative eye position, relative pupil position, eye gaze direction, pupil size, and/or eye movement (e.g., is the eye gaze relatively static or moving and if so in which direction).

At block 2206, the method can determine an optical path between a light engine and the eye location. The optical path can include a first focusing element and a second focusing element that includes multiple coplanar lenses.

At block 2208, the method can create an eye box at the eye that corresponds to the image data. In some cases, the eye box can be created by driving the multiple pixels of the light engine at individual selected parameter values (for each individual pixel) in relation to the image data. The eye box can include a first portion formed with a first subset of the multiple coplanar lenses and a second portion formed with a second subset of the multiple coplanar lenses. The creation of the eye box can cause light from an individual pixel to travel through only the first subset of the multiple coplanar lenses and not the second subset of the multiple coplanar lenses. In some cases, creation of the eye box can purposely produce gaps in the eye box where light from the individual pixel does not arrive. In other cases, the creation can involve turning off the individual pixel if light from the pixel would reach the second subset of the multiple coplanar lenses. In some implementations, in an instance where light from the individual pixel would reach the second subset of the multiple coplanar lenses, the creation can utilize the light to create another part of the image.

At block 2210, the method can repeat the process. For instance, the process may be repeated at a refresh rate of the light engine and/or whenever a change is detected relative to the user's eye. For instance, if the user's eye gaze direction is changing, the method can be repeated at a higher rate than if the gaze direction is static.

Various examples are described above. Additional examples are described below. One example includes head mounted display device, comprising a light engine configured to generate light corresponding to image data, a housing configured to be positioned relative to a head of a user and to position the light engine in front of an eye of the user, and an optical assembly positioned by the housing between the light engine and the eye. The optical assembly comprises a first sub-assembly positioned proximate to the light engine and configured to focus the light toward an eye box a defined distance toward the user from the optical assembly and a second sub-assembly positioned distal to the light engine and configured to collimate at least some of the light toward the eye box to form an image in the eye box.

Another example can include any of the above and/or below examples where the first sub-assembly comprises a single lens, multiple lenses, or a lens and a prism.

Another example can include any of the above and/or below examples where the second sub-assembly comprise multiple coplanar lenses.

Another example can include any of the above and/or below examples where the multiple coplanar lenses are all a same size or wherein the multiple coplanar lenses are at least two different sizes.

Another example can include any of the above and/or below examples where only a subset of the multiple coplanar lenses is used to create a portion of the eye box and another subset of the multiple coplanar lenses are used to create another portion of the eye box.

Another example can include any of the above and/or below examples where the multiple coplanar lenses comprise multiple coplanar planoconvex lenses.

Another example can include any of the above and/or below examples where the multiple coplanar planoconvex lenses are oriented in a two-dimensional array.

Another example can include any of the above and/or below examples where all of the lenses of the multiple coplanar planoconvex lenses have the same shape or wherein individual lenses of the multiple coplanar planoconvex lenses have dissimilar shapes.

Another example can include any of the above and/or below examples where the head mounted display device further comprises an eye tracking unit positioned by the housing to identify a pupil location and size relative to the eye box and a gaze direction of the eye.

Another example can include any of the above and/or below examples where the head mounted display device further comprises a controller configured to determine an optical path between the light engine and the pupil location.

Another example can include any of the above and/or below examples where the head mounted display device can be configured to receive the image data and further configured to customize the image data based upon the pupil location and/or the gaze direction.

Another example can include any of the above and/or below examples where the controller is configured to enhance image data associated with portions of the image in the eye box that are perceivable by the user from the pupil position and gaze direction.

Another example can include any of the above and/or below examples where the head mounted display device further comprises correction data relating to the optical assembly stored on storage of the device, and wherein the controller is configured to adjust driving the light engine in relation to image data based at least in part upon the correction data.

Another example can include any of the above and/or below examples where the light engine comprises multiple independently controllable pixels and wherein the controller is configured to customize the image data and to turn off individual pixels that would produce the light that would not be perceptible to the user based upon the eye position and the gaze direction.

Another example can include any of the above and/or below examples where the controller is configured to control individual pixels that produce the light that is directed to a foveal region of the eye differently than individual pixels that produce the light that is directed to non-foveal regions of the eye.

Another example includes a head mounted display device comprising a light engine configured to generate light corresponding to image data, a housing having an inwardly facing side and an outwardly facing side, the inwardly facing side configured to be engaged by a head of a user to position the housing relative to an eye of the user, and an optical assembly and the light engine positioned by the housing transverse to an axis extending through the eye. The optical assembly comprising a first sub-assembly positioned proximate to the light engine and having a surface profile facing the light engine that has a low rate of curvature proximate to the axis at a center of the first sub-assembly and an increasing rate of curvature toward a periphery of the first sub-assembly and a second sub-assembly positioned distal to the light engine and comprising multiple coplanar convex lenses configured to collimate at least some of the light toward an eye box positioned proximate to the inwardly facing side.

Another example can include any of the above and/or below examples where the first sub-assembly comprises a first number of lenses and the second sub-assembly comprises a second different number of lenses.

Another example can include any of the above and/or below examples where the head mounted display device further comprises an isolation structure positioned between the light engine and the optical assembly, the isolation structure configured to allow the light to travel parallel to the axis and to block light traveling at other orientations.

Another example can include any of the above and/or below examples where the isolation structure comprises alternating optically opaque and optically transparent regions.

Another example includes a head mounted display device comprising a light engine comprising an array of individually controllable pixels that can be energized to emit light and an optical assembly physically aligned with the light engine and comprising a set of focusing elements facing toward the light engine and a different set of focusing elements facing away from the light engine.

Another example can include any of the above and/or below examples where the set of focusing elements is configured to focus the light toward an axis that transverses the light engine and the optical assembly and the different set of focusing elements are configured to collimate the light received from the set of focusing elements in an eye box along the axis.

Another example can include any of the above and/or below examples where the head mounted device is dimensionally constrained such that a distance between the light engine and the set of focusing elements is less than a second distance between the different set of focusing elements and the eye box.

Another example includes a device implemented method comprising receiving image data, receiving data relating to an eye location, determining an optical path between a light engine and the eye location, the optical path including a first focusing element and a second focusing element that includes multiple coplanar lenses, and creating an eye box at the eye that corresponds to the image data, the eye box including a first portion formed with a first subset of the multiple coplanar lenses and a second portion formed with a second subset of the multiple coplanar lenses.

Another example can include any of the above and/or below examples where the light engine includes multiple pixels and wherein the creating causes light from an individual pixel to travel through only the first subset of the multiple coplanar lenses and not the second subset of the multiple coplanar lenses.

Another example can include any of the above and/or below examples where the creating produces gaps in the eye box where light from the individual pixel does not arrive.

Another example can include any of the above and/or below examples where the creating comprises turning off the individual pixel if light from the pixel would reach the second subset of the multiple coplanar lenses.

Another example can include any of the above and/or below examples where the creating comprises in an instance where light from the individual pixel would reach the second subset of the multiple coplanar lenses, utilizing the light to create another part of the image.

CONCLUSION

Although the subject matter has been described in language specific to structural features and/or methodological acts, it is to be understood that the subject matter defined in the appended claims is not limited to the specific features or acts described above. Rather, the specific features and acts described above are disclosed as example forms of implementing the claims and other features and acts that would be recognized by one skilled in the art are intended to be within the scope of the claims.

The invention claimed is:

1. A head mounted display device, comprising:
   a light engine configured to generate light corresponding to image data;
   a housing configured to be positioned relative to a head of a user and to position the light engine in front of an eye of the user along an optical axis extending from the eye; and,
   an optical assembly positioned by the housing between the light engine and the eye along the optical axis, the optical assembly comprising:
   a first sub-assembly positioned proximate to the light engine and configured to direct the light toward a second sub-assembly,
   the second sub-assembly positioned distal to the light engine and configured to direct at least some of the light toward an eye box to form an image in the eye box;
   an eye tracking unit positioned by the housing to identify a pupil position and size relative to the eye box and a gaze direction of the eye; and,
   a controller configured to determine an optical path between the light engine and the pupil position and configured to enhance image data associated with portions of the image in the eye box that are perceivable by the user as determined at least in part from the pupil position and gaze direction or to decrease image data associated with portions of the image in the eye box that are not perceivable by the user as determined at least in part from the pupil position and gaze direction.

2. The head mounted display device of claim 1, wherein the first sub-assembly comprises a single lens, multiple lenses, or a lens and a prism.

3. The head mounted display device of claim 2, wherein the second sub-assembly comprises multiple coplanar lenses.

4. The head mounted display device of claim 3, wherein the multiple coplanar lenses are all a same size or wherein the multiple coplanar lenses are at least two different sizes.

5. The head mounted display device of claim 3, wherein only a subset of the multiple coplanar lenses is used to create a portion of the eye box and another subset of the multiple coplanar lenses are used to create another portion of the eye box.

6. The head mounted display device of claim 3, wherein the multiple coplanar lenses comprise multiple coplanar planoconvex lenses.

7. The head mounted display device of claim 6, wherein the multiple coplanar planoconvex lenses are oriented in a two-dimensional array.

8. The head mounted display device of claim 6, wherein all of the lenses of the multiple coplanar planoconvex lenses have the same shape or wherein individual lenses of the multiple coplanar planoconvex lenses have dissimilar shapes.

9. The head mounted display device of claim 1, wherein the eye tracking unit comprises multiple eye tracking units.

10. The head mounted display device of claim 9, wherein the controller is further configured to detect eye movement.

11. The head mounted display device of claim 10, wherein the controller is configured to receive the image data and further configured to customize the image data based upon the pupil position, the gaze direction, and/or the eye movement.

12. The head mounted display device of claim 11, wherein the controller is configured to control the light engine to employ only a spaced apart subset of available light emitting elements to generate the image at an instance in time.

13. The head mounted display device of claim 11, further comprising correction data relating to the optical assembly stored on storage of the device, and wherein the controller is configured to adjust driving the light engine in relation to the image data based at least in part upon the correction data.

14. The head mounted display device of claim 11, wherein the light engine comprises multiple independently controllable pixels and wherein the controller is configured to customize the image data and to turn off individual pixels that would produce the light that would not be perceptible to the user based upon the pupil position and the gaze direction.

15. The head mounted display device of claim 11, wherein the controller is configured to control individual pixels that produce the light that is directed to a foveal region of the eye differently than individual pixels that produce the light that is directed to non-foveal regions of the eye.

16. A head mounted display device, comprising:
   a light engine configured to generate light corresponding to image data;
   a housing having an inwardly facing side and an outwardly facing side, the inwardly facing side configured to be engaged by a head of a user to position the housing relative to an eye of the user; and,
   an optical assembly and the light engine positioned by the housing transverse to an axis extending through the eye, the optical assembly comprising:
   a first sub-assembly positioned proximate to the light engine and having a surface profile facing the light engine that has a low rate of curvature proximate to the axis at a center of the first sub-assembly and an increasing rate of curvature toward a periphery of the first sub-assembly; and,
   a second sub-assembly positioned distal to the light engine and comprising multiple coplanar convex lenses configured to collimate at least some of the light toward an eye box positioned proximate to the inwardly facing side.

17. The head mounted display device of claim 16, wherein the first sub-assembly comprises a first number of lenses and the second sub-assembly comprises a second different number of lenses.

18. The head mounted display device of claim 16, further comprising an isolation structure positioned between the light engine and the optical assembly, the isolation structure configured to allow the light to travel parallel to the axis and to block light traveling at other orientations.

19. The head mounted display device of claim 18, wherein the isolation structure comprises alternating optically opaque and optically transparent regions.

20. A head mounted display device, comprising:
   a light engine positioned along an optical axis and comprising an array of individually controllable pixels that can be energized to emit light; and,
   an optical assembly physically aligned along the optical axis with the light engine and comprising a set of multiple focusing elements facing toward the light engine and configured to receive the emitted light and a different set of multiple focusing elements facing away from the light engine and configured to receive the emitted light from the set of multiple focusing elements and direct the emitted light toward an eye box positioned along the optical axis.

* * * * *